United States Patent
Yin et al.

(10) Patent No.: US 11,448,279 B2
(45) Date of Patent: Sep. 20, 2022

(54) DAMPER APPARATUS FOR USE WITH VEHICLE TORQUE CONVERTERS

(71) Applicant: VALEO KAPEC CO., LTD., Daegu (KR)

(72) Inventors: Xuexian Yin, Daegu (KR); Alexandre Depraete, Shinjuku-ku (JP)

(73) Assignee: VALEO KAPEC CO., LTD., Daegu (KR)

( * ) Notice: Subject to any disclaimer, the term of this patent is extended or adjusted under 35 U.S.C. 154(b) by 425 days.

(21) Appl. No.: 16/671,785

(22) Filed: Nov. 1, 2019

(65) Prior Publication Data

US 2020/0141465 A1     May 7, 2020

Related U.S. Application Data

(60) Provisional application No. 62/754,332, filed on Nov. 1, 2018.

(51) Int. Cl.
| | |
|---|---|
| *F16F 1/48* | (2006.01) |
| *F16F 15/12* | (2006.01) |
| *F16H 45/02* | (2006.01) |

(52) U.S. Cl.
CPC ............ *F16F 1/48* (2013.01); *F16F 15/1206* (2013.01); *F16H 45/02* (2013.01); *F16F 2236/08* (2013.01)

(58) Field of Classification Search
CPC ...... F16F 1/48; F16F 15/1206; F16F 15/2236; F16F 15/08
See application file for complete search history.

(56) References Cited

U.S. PATENT DOCUMENTS

| | | | |
|---|---|---|---|
| 9,316,299 B2 | 4/2016 | Doegel et al. | |
| 9,500,259 B1 * | 11/2016 | Bai | F16F 15/1206 |
| 2007/0037659 A1 * | 2/2007 | Bailey | F16F 15/1206 475/296 |
| 2016/0102746 A1 * | 4/2016 | Depraete | F16F 15/1206 475/59 |
| 2017/0122403 A1 | 5/2017 | Kobayashi et al. | |
| 2017/0276222 A1 * | 9/2017 | Takahashi | F16F 15/1206 |
| 2018/0135736 A1 * | 5/2018 | Li | F16H 45/02 |
| 2018/0149232 A1 | 5/2018 | Yoshikawa et al. | |

* cited by examiner

*Primary Examiner* — Melanie Torres Williams
(74) *Attorney, Agent, or Firm* — Oblon, McClelland, Maier & Neustadt, L.L.P.

(57) ABSTRACT

Damper apparatus for use with vehicle torque converters are disclosed. A disclosed damper assembly for a vehicle torque converter includes a first portion operatively coupled to a clutch of the vehicle torque converter and configured to receive an engine torque from the clutch based on a state of the clutch. The damper assembly also includes a second portion and a hub rotatably coupled to a turbine of the vehicle torque converter. The damper assembly also includes a gear train including a ring gear coupled to the first portion, a planet gear rotatably coupled to the second portion, and a sun gear coupled to the hub. The damper assembly also includes a primary damping element positioned in a cavity formed by the second portion. Rotation of the first portion relative to the second portion compresses and decompresses the primary damping element to dampen a torsional vibration associated with the engine torque.

11 Claims, 15 Drawing Sheets

DAMPER APPARATUS FOR USE WITH VEHICLE TORQUE CONVERTERS

RELATED APPLICATION

This patent arises from U.S. Provisional Application No. 62/754,332, which was filed on Nov. 1, 2018. U.S. Provisional Application No. 62/754,332 is hereby incorporated by reference in its entirety. Priority to U.S. Provisional Application No. 62/754,332 is hereby claimed.

FIELD OF THE DISCLOSURE

This disclosure relates generally to vehicles and, more particularly, to damper apparatus for use with vehicle torque converters.

BACKGROUND

Some motor vehicles (e.g., vehicles having automatic transmission functionality) employ fluid couplings such as torque converters that are interposed between an engine and a transmission to facilitate transferring torque therebetween. Typically, such torque converters utilize a lock up clutch having a damper device, often including one or more coil springs, that is configured to reduce torsional vibrations and/or sudden rotational movements provided by the engine when the lock up clutch is engaged, which improves part life for moving components associated with a vehicle.

SUMMARY

An example damper assembly for a vehicle torque converter includes a first portion that is operatively coupled to a clutch of the vehicle torque converter and configured to receive an engine torque from the clutch based on a state of the clutch. The damper assembly also includes a hub rotatably coupled to a turbine of the vehicle torque converter. The damper assembly also includes a second portion interposed between the first portion and the hub. The first portion, the second portion, and the hub are rotatable relative to each other about an axis of the vehicle torque converter. The damper assembly also includes a gear train that includes a ring gear coupled to the first portion, a planet gear rotatably coupled to the second portion, and a sun gear coupled to the hub. The planet gear is operatively coupled between the ring gear and the sun gear. The damper assembly also includes a primary damping element positioned in a cavity formed by the second portion. Rotation of the first portion relative to the second portion compresses and decompresses the primary damping element to dampen a torsional vibration associated with the engine torque.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In general, the same reference numbers will be used throughout the drawing(s) and accompanying written description to refer to the same or like parts.

DETAILED DESCRIPTION

Figure 1:
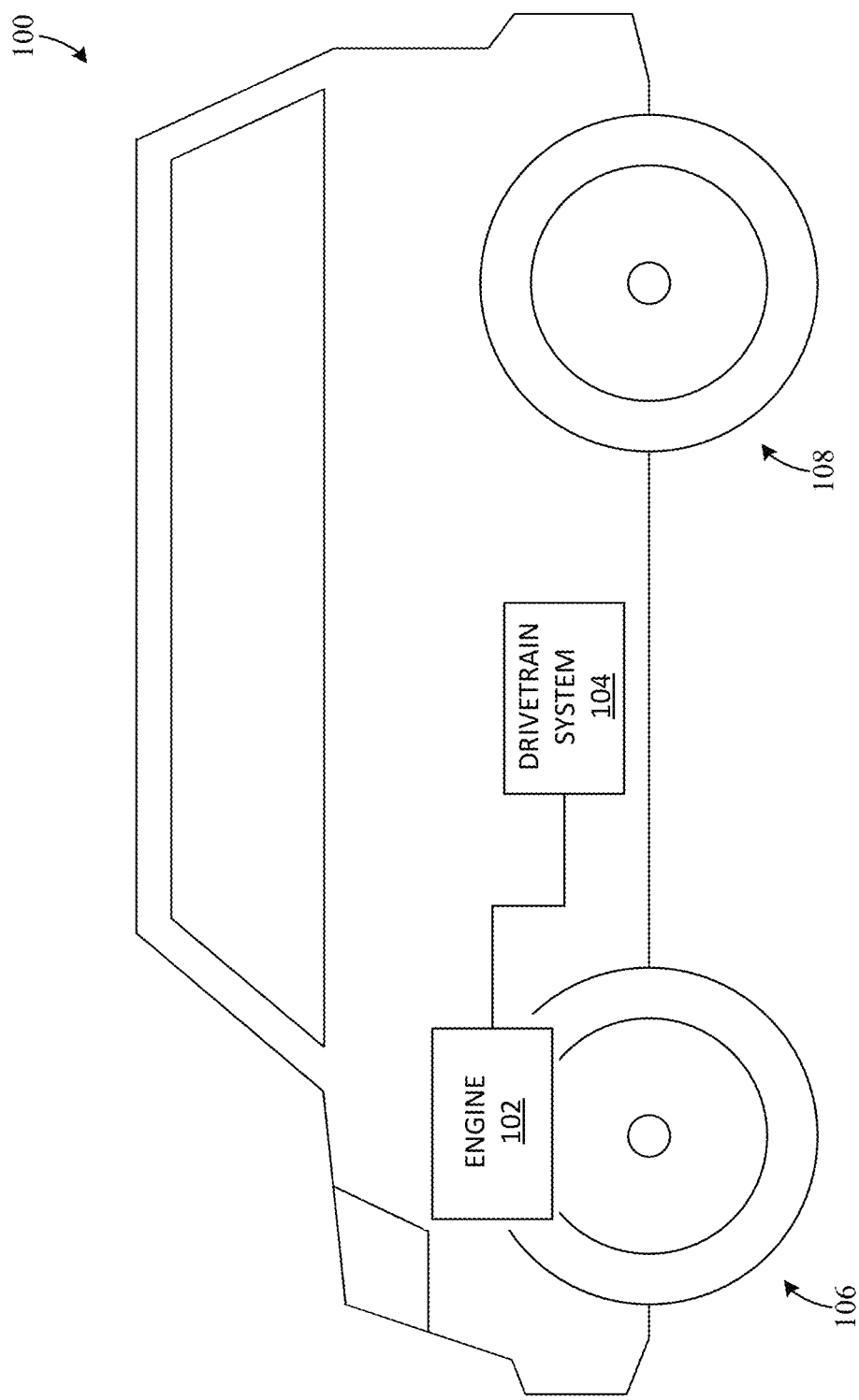
FIG. 1 is a schematic illustration of an example vehicle in which examples disclosed herein can be implemented.

Damper apparatus for use with vehicle torque converters are disclosed. Examples disclosed herein provide one or more damper assemblies for a vehicle torque converter that have improved damping performance when a clutch (e.g., a lock up clutch) of the torque converter is engaged. A disclosed damper assembly includes an example planetary gear train that is operatively coupled to and/or interposed between an output shaft of the torque converter, the clutch, and a turbine of the torque converter and configured to transfer torque therebetween. The disclosed planetary gear train includes an example sun gear, an example ring gear, and one or more example planetary or planet gears that operatively couple the sun gear to the ring gear. The ring gear is connected to a portion (e.g., a clutch plate) of the clutch to receive a torque (e.g., an engine torque) when the clutch is engaged. The sun gear is coupled to a hub (e.g., a turbine hub) of the vehicle torque converter that is splined with the output shaft. Further, the sun gear is connected, via the output shaft, to a transmission system of the vehicle to provide at least a portion of the torque thereto. The planetary gear(s) are rotatably coupled to a planetary carrier (e.g., one or more plates) and configured to transfer torque between the ring and sun gears.

In particular, the disclosed planetary carrier has one or more spring dampers (e.g., coil springs) that are positioned within spring cavities of the carrier and configured to change state (e.g., compress and/or decompress) based on movement of the ring gear relative to the carrier, which provides a damping effect via the spring dampers. That is, a component (e.g., a plate affixed to the ring gear) associated with the ring gear engages and/or otherwise drives such spring damper operation during vehicle engine operation when the clutch is engaged. In this manner, disclosed examples dampen rotational movement between an engine of the vehicle and the transmission system, thereby reducing and/or eliminating harmful torsional vibrations and/or sudden rotational movements that would have otherwise been transferred from the engine to the transmission system and/or other driveline components. That is, disclosed examples dampen one or more torsional vibrations associated with the torque received by the ring gear in response to rotation of the ring gear relative to carrier. More particularly, an amount or a degree of damper travel of a disclosed damper assembly is based on gear ratios defined between the ring gear, the planetary gear(s), and the sun gear. In some disclosed examples, the gear ratios are configured such that the damper travel is substantially longer (e.g., several times longer) than the spring damper(s). For example, a ratio defined by the ring gear and the sun gear is between about 2 and about 6, which acts as a multiple to extend the damper travel and also as a divisor to decrease damper stiffness. Further, this ratio also increases engine torque applied on the spring damper(s). In particular, this ratio is configured based on one or more of a target stiffness of the spring damper(s), a target torque capacity limitation of the spring damper(s), and/or packaging requirements of the damper assembly.

Moreover, by operatively coupling the sun and ring gears together via a single set of planetary gears (i.e., a single planetary carrier having one or more planetary gears rotatably coupled thereto), disclosed examples save space in the torque converter as well as reduce part complexity typically associated with known damper systems for vehicle torque converters. As a result, disclosed examples reduce costs that would have otherwise been incurred by these known damper systems.

Some disclosed examples provide one or more example coupling mechanisms (e.g., a ring and/or a plate interposed between the turbine and the planetary carrier) that are structured and/or configured to couple the turbine of the torque converter to the planetary carrier, which enables the turbine and the planetary carrier to rotate cooperatively, as discussed further below in connection with FIGS. 3-9. Stated differently, in such examples, the turbine is connected to a damper output (e.g., the planetary carrier) or secondary side of a disclosed damper assembly, which reduces noise, vibration, and harshness (NVH) and/or otherwise improves NVH performance associated with the torque converter and/or the vehicle transmission system. Some disclosed examples provide one or more other example coupling mechanisms (e.g., protrusions and/or tabs extending between the turbine to the ring gear) that are structured and/or configured to couple the turbine to the ring gear (and/or the plate affixed to the ring gear), which enables the turbine and the ring gear to rotate cooperatively, as discussed further below in connection with FIGS. 12-14. Stated differently, in such examples, the turbine is connected to a damper input (e.g., the ring gear) or primary side of a disclosed damper assembly, which similarly reduces NVH and/or otherwise improves NVH performance associated with the torque converter and/or the vehicle transmission system. In any case, the turbine is not directly connected to the transmission system. As such, inertia and/or mass of the turbine do not affect the transmission system when the clutch is engaged due to a disclosed damper assembly being operatively interposed between the turbine and the transmission system. In particular, to enable the sun gear to rotate independently relative to the turbine, disclosed examples provide another example coupling mechanism that is structured and/or configured to rotatably couple the sun gear to the turbine, as discussed further below in connection with FIG. 10.

FIG. 1 is a view of an example vehicle (e.g., a car, a truck, a sport utility vehicle (SUV), etc.) 100 in which examples disclosed herein can be implemented. According to the illustrated example of FIG. 1, the vehicle 100 includes an example engine (e.g., an internal combustion engine) 102, an example drivetrain system 104, and one or more examples wheels 106, 108 (sometimes referred to as road wheels), two of which are shown in this examples, (i.e., a first or front wheel 106 and a second or rear wheel 108). The drivetrain system 104 of FIG. 1 is structured and/or configured to transfer torque from the engine 102 to the wheel(s) 106, 108 to cause the vehicle 100 to move, for example, via one or more driveshafts, one or more clutches, one or more axles, a torque converter, a transmission system (e.g., an automatic transmission system), etc., as discussed further below. For example, the engine 102 generates a torque (sometimes referred to as an engine torque) and, in response, the drivetrain system 104 controls an amount or degree of the torque provided to the wheel(s) 106, 108. In some examples, the vehicle 100 has rear-wheel drive functionality such that the drivetrain system 104 provides engine torque only to the rear vehicle wheel(s) 108. However, in other examples, the vehicle 100 may be implemented differently (e.g., having front-wheel drive and/or all-wheel drive functionality).

In some examples, the vehicle 100 includes a controller (e.g., an electronic control unit (ECU)) that is configured to change a state of a torque converter clutch (e.g., a lock up clutch) between a first state (e.g., an engaged state) and a second state (e.g., a disengaged state). For example, the controller transmits power and/or a control or command signal to an actuator system that is associated with the drivetrain system 104 and operatively coupled to the torque converter clutch. In response, a movable component (e.g., a hydraulic piston) of the actuator system causes the clutch to change between the first and second states.

Figure 2:
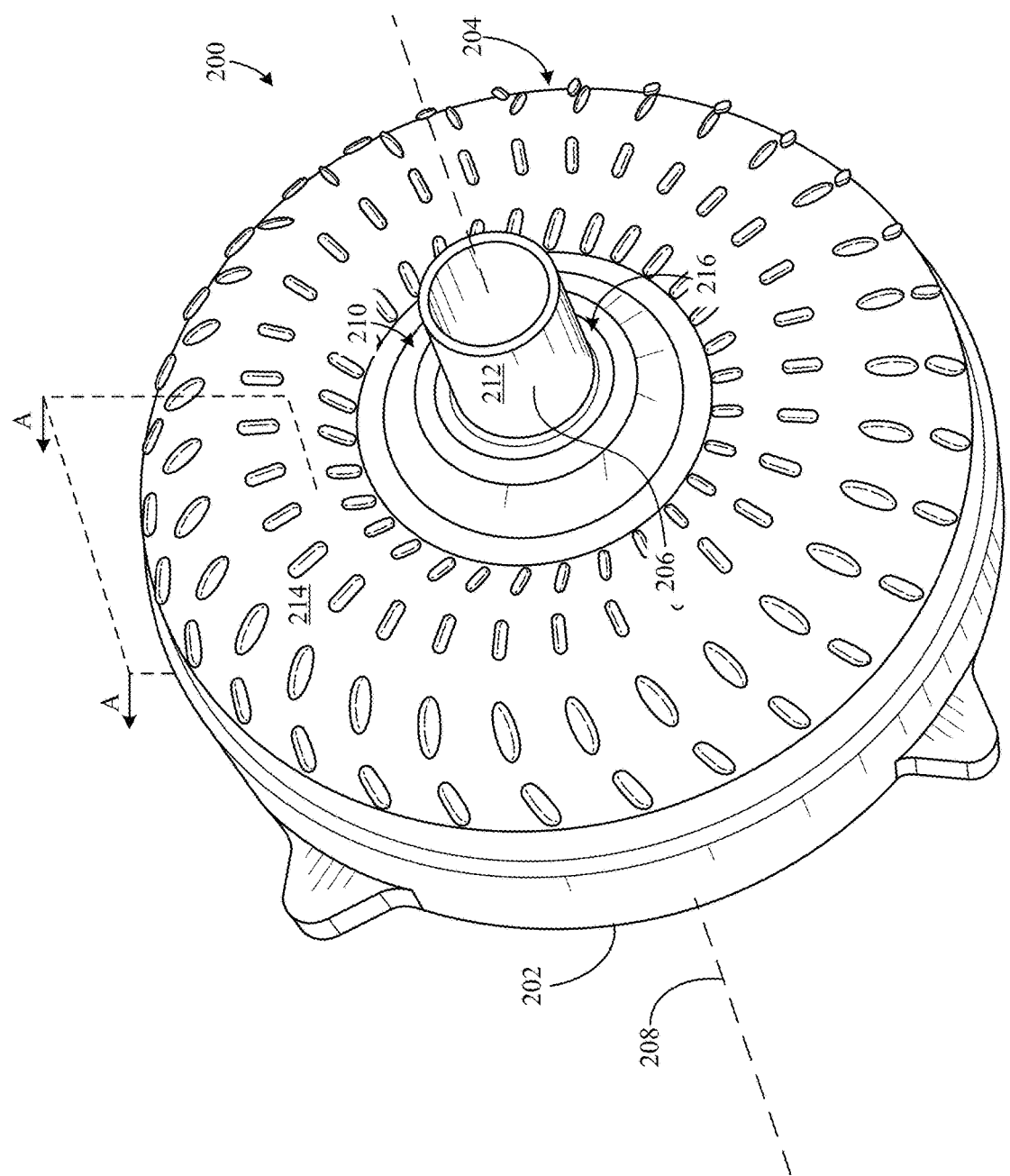
FIG. 2 is a view of an example torque converter in which examples disclosed herein can be implemented.

FIG. 2 is a view of an example torque converter 200 in which examples disclosed herein can be implemented. In some examples, the torque converter 200 of FIG. 2 is used to implement at least a portion of the drivetrain system 104 of FIG. 1. According to the illustrated example of FIG. 2, the torque converter 200 includes an example cover 202, an example impeller 204, and a first example shaft (e.g., an output shaft of the torque converter 200 and/or an input shaft of a vehicle transmission system) 206. In particular, the torque converter 200 is configured and/or structured to operatively couple between the engine 102 and a vehicle transmission system (e.g., an automatic transmission system) to facilitate transferring torque therebetween. For example, the torque converter allows the engine 102 to remain in operation while the vehicle 100 is stopped (e.g., when vehicle brakes are applied) without causing the engine 102 to stall. In some examples, when driving the vehicle 100 at certain speeds, the torque converter 200 increases or multiplies the engine torque provided to the transmission system and/or the wheel(s) 106, 108.

The cover 202 of FIG. 2 is structured and/or configured to couple to a component (e.g., a flywheel) associated with the engine 102 to receive a torque (i.e., an engine torque) or output from the engine 102. That is, the output of the engine 102 causes the cover 202 and the impeller 204 to rotate relative to a first example axis 208 of the vehicle torque converter 200. In response to such rotation, the torque converter 200 generates a torque for the first shaft 206 and/or otherwise transfers (e.g., via a damper assembly) at least a portion of the engine torque from the engine 102 to the first shaft 206. In some examples, the torque converter 200 is implemented with an example flywheel that is coupled to the cover 202. According to the illustrated example of FIG. 2, the cover 202 and the impeller 204 form and/or define a housing of the torque converter 200 in which one or more torque converter components are positioned.

The impeller 204 of FIG. 2 is coupled to the cover 202, for example, via one or more example fasteners and/or one or more example fastening methods or techniques (e.g., welding). As such, the impeller 204 and the cover 202 rotate cooperatively. In particular, when the impeller 204 rotates relative to the first axis 208, the impeller 204 is structured and/or configured to control a flow of an example fluid (e.g., oil) 310 (shown in FIG. 3) within the torque converter 200, for example, via one or more of fins, blades, vanes, and/or any other appropriate fluid flow control member associated with controlling fluid flow, as discussed further below. Such fluid is sometimes referred to as transmission fluid.

The first shaft 206 of FIG. 2 is relatively rotatably coupled to the impeller 204, for example, via an example bearing 210 interposed between a surface (e.g., an outer surface) 212 of the first shaft 206 and a surface (e.g., an inner surface) 214 of the impeller 204. As such, the first shaft 206 and the impeller 204 can independently rotate relative to each other. In particular, the first shaft 206 is structured and/or configured to transfer torque from the torque converter 200 to the transmission system of the vehicle 100. For example, the first shaft 206 extends at least partially through the impeller 204 via an example opening 216 positioned thereon to fixedly couple to one or more components (e.g., a portion of a damper assembly) of the torque converter 200 and receive torque therefrom. As such, the first shaft 206 and the torque converter component(s) rotate cooperatively. Further, the first shaft 206 also couples (e.g., directly or via one or more intermediate components) to a portion of the transmission system to provide engine torque thereto, thereby driving the wheel(s) 106, 108.

Figure 3:
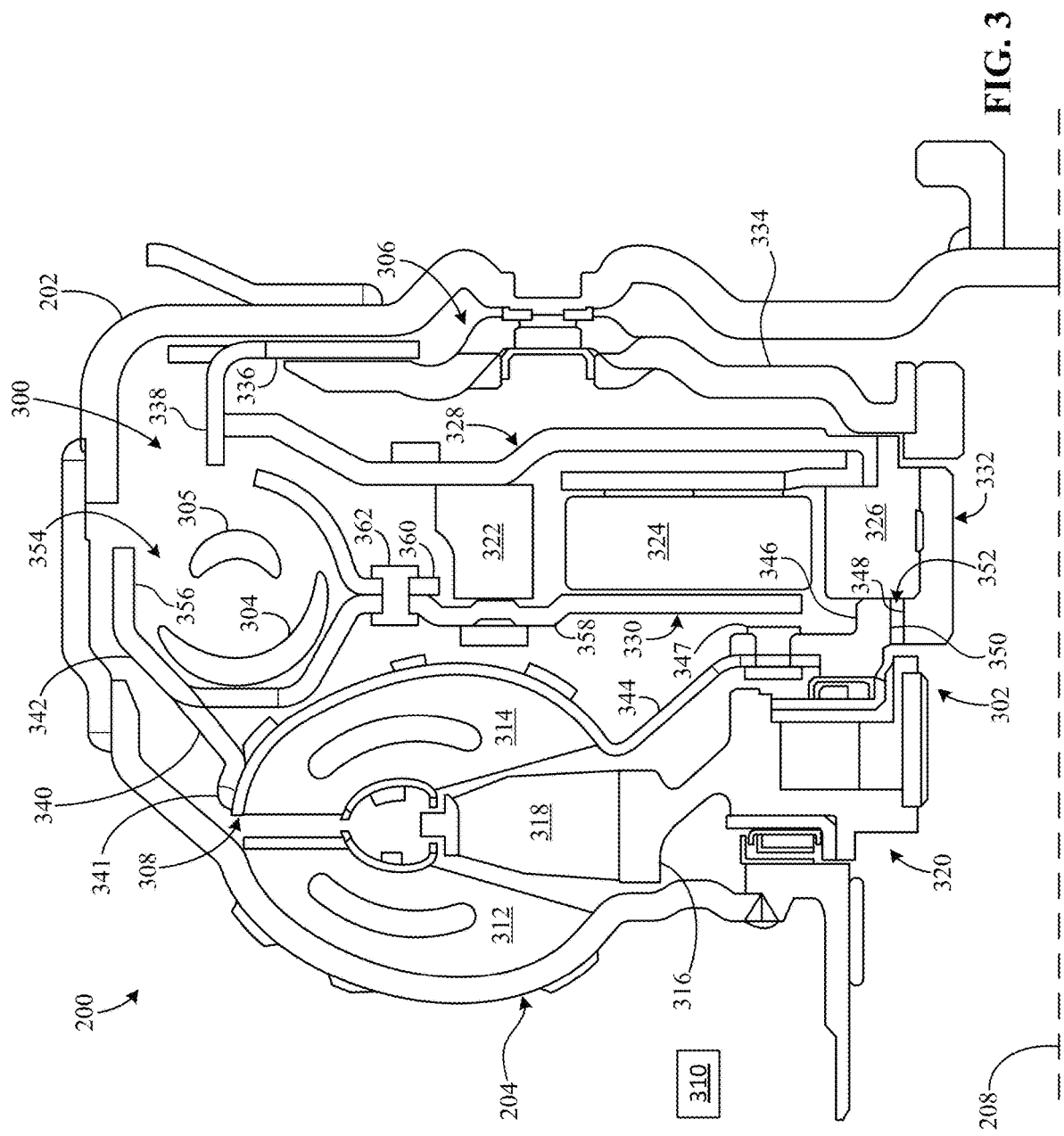
FIG. 3 is a partial cross-sectional view of the example torque converter of FIG. 2 along line A-A and shows a first example damper assembly in accordance with the teachings of this disclosure.

FIG. 3 is a partial cross-sectional view of the torque converter 200 of FIG. 2 along line A-A and shows a first example damper assembly 300 in accordance with the teachings of this disclosure. According to the illustrated example, the first damper assembly 300 includes an example gear system (e.g., a gear train such as a planetary gear train) 302 and one or more example primary damping elements (e.g., coil springs) 304 to provide a damping effect when compressed and/or decompressed, one of which is shown in this example. Additionally, in some examples, the first damper assembly 300 similarly includes one or more secondary damping elements (e.g., relatively small coil springs) 305 to improve the damping effect when compressed and/or decompressed, one of which is shown in this example. In particular, the first damper assembly 300 is operatively coupled and/or interposed between an example clutch (e.g., a lock up clutch) 306 of the torque converter 200 and the first shaft 206, which facilitates and/or improves torque transfer from the clutch 306 (i.e., from the engine 102) to the first shaft 206 when the clutch 306 is in an engaged state. Further, as shown in FIG. 3, the first damper assembly 300 is also operatively coupled and/or interposed between an example turbine 308 of the torque converter 200 and the first shaft 206, which may similarly facilitate and/or improve transferring torque from the turbine 308 to the first shaft 206 when the clutch 306 is in a disengaged state. More particularly, the first damper assembly 300 is structured and/or configured to reduce, mitigate, and/or prevent torsional vibrations and/or sudden movements from being experienced by the first shaft 206 during operation of the engine 102, which increases part life of component(s) of the vehicle transmission system and/or other moving component(s) associated with the drivetrain system 104. That is, the first damper assembly 300 absorbs such vibrations and/or movements of the clutch 306 and/or the turbine 308, as discussed further below.

The turbine 308 of FIG. 3 is configured to receive the aforementioned fluid 310 from the impeller 204 during vehicle operation, thereby generating torque. For example, the impeller includes one or more example fluid flow control members (e.g., fins, blades, vanes) 312 positioned thereon that are radially distributed and extend radially outward relative to the first axis 208. Similarly, the turbine 308 includes one or more example fluid flow control members (e.g., fins, blades, vanes, etc.) 314 positioned thereon that are radially distributed and extend radially outward relative to the first axis 208. As the fluid flow control members 312 of the impeller 204 rotate cooperatively with the cover 202 relative to the first axis 208, the fluid 310 is urged and/or pumped radially outward relative to the first axis 208 toward the fluid flow control members 314 of the turbine 308. That is, the fluid flow control members 312 of the impeller 204 direct a flow the fluid 310 onto the fluid flow control members 314 of the turbine 308. As a result, the turbine 308 generates torque, a degree of which is based on one or more parameters associated with the torque converter 200 such as, for example, one or more of a rotational speed of the impeller 204, a rotational speed of the turbine 308, angles of the respective fluid flow control members 312, 314, lengths of the respective blades fluid flow control members 312, 314, properties (e.g., viscosity) of the fluid 310, etc.

In some examples, to increase the torque generated by the turbine 308, the torque converter 200 includes an example stator 316 operatively interposed between the impeller 204 and the turbine 308. The stator 316 of FIG. 3 includes one or more fluid flow control members (e.g., fins, blades, vanes, etc.) 318 that are radially distributed and extend radially outward relative to the first axis 208. In particular, the fluid flow control members 318 of the stator 316 are configured to change a flow direction of the fluid 310 from the turbine 308 to the impeller 204, which increases efficiency of the impeller 204 in pumping the fluid 310 and/or, more generally, increases efficiency of the torque converter 200. For example, as the turbine 308 rotates, the fluid flow control members 314 of the turbine 308 direct the fluid 310 onto the fluid flow control members 318 of the stator 316 in a first direction and, in response, the fluid flow control members 318 of the stator 316 direct the fluid 310 onto the fluid flow control members 312 of the impeller 204 in a second direction different from the first direction. Such control of the fluid 310 may cause the stator 316 to rotate relative to the first axis 208 (e.g., at relatively high speeds of the vehicle 100). However, to limit rotation of the stator 316, the torque converter 200 includes an example clutch (e.g., a one-way clutch) 320 coupled to the stator 316 and interposed between the impeller 204 and the turbine 308. In particular, the clutch 320 is configured to prevent the stator 316 from rotating relative to the first axis 208 in a single direction (e.g., clockwise or counterclockwise).

The gear system 302 of FIG. 3 includes a first example gear 322 (e.g., a spur or helical gear) (sometimes referred to as a ring gear), one or more second example gears 324 (e.g., spur or helical gear(s)) (sometimes referred to as planetary or planet gears), and a third example gear 326 (e.g., a spur or helical gear) (sometimes referred to as a sun gear). The first gear 322, the second gear(s) 324, and the third gear 326, together, may be referred to as one or more of a planetary gear train, an epicyclic gear train, and/or a differential gear train. In particular, each of the gears 322, 324, 326 has teeth positioned on an outer surface thereof to engage at least a different one of the gears 322, 324, 326. For example, the second gear(s) 324 operatively couple the first and third gear 322, 326 together. As such, the teeth of the second gear(s) 324 are meshed with the teeth of respective ones of the first and third gears 322, 326.

The first damper assembly 300 of FIG. 3 also includes a first example portion 328, a second example portion 330 (sometimes referred to as a carrier or planet carrier), and a third example portion (e.g., a cylindrical body) 332, each of which is associated with operation of a respective one of the first, second, and third gears 322, 324, 326. The first portion 328, the second portion 330, and the third portion 332 are rotatable relative to each other about the first axis 208. Each of the first portion 328 and the second portion 330 of FIG. 3 can be implemented, for example, using one or more annular bodies such as plate(s) or disc(s) (e.g., assembled). In some examples, the third portion 332 of FIG. 3 is a hub of the vehicle torque converter 200 such as, for example, a turbine hub. As shown in FIG. 3, the second portion 330 is interposed between the first portion 328 and the third portion 332.

According to the illustrated example of FIG. 3, the first gear 322 is fixedly coupled to the first portion 328, for example, via one or more fasteners (e.g., bolt(s), nut(s), screw(s), etc.) and/or one or more fastening methods or techniques (e.g., welding). Also the first gear 322 may be integral with the first portion 328. Further, each of the second gear(s) 324 is rotatably coupled to the second portion 330 such that the second gear(s) 324 can rotate relative to the second portion 330, for example, via one or more bearings (e.g., ball bearings) operatively coupled to and/or interposed between each second gear 324 and the second portion 330. Further still, the third gear 326 is fixedly coupled to the third portion 332, for example, via one or more fasteners and/or fastening methods or techniques (e.g., welding). Also the third gear 326 may be integral with the third portion 332. In particular, as previously mentioned, the second gear(s) 324 are operatively coupled to and/or interposed between the first gear 322 and the third gear 326 and configured to transfer torque, for example, between the first, second, and third portions 328, 330, 332 of the first damper assembly 300. More particularly, a rotational speed of the third gear 326 is based on rotational speeds of the respective first gear 322 and the second portion 330 as well as gear ratios defined by the first, second, and third gears 322, 324, 326.

The first portion 328 of the first damper assembly 300 is operatively coupled to the clutch 306 and configured to receive the engine torque from the clutch 306 based on the state of the clutch 306. As shown in FIG. 3, the clutch 306 includes an example piston (e.g., an axially movable piston) 334 and a plate or disc 336 (sometime referred to as a clutch plate) interposed between the cover 202 and the piston 334. The clutch plate 336 of FIG. 3 includes one or more connecting portions (e.g., protrusions and/or tabs) 338 that extend along the first axis 208 and/or curve toward the first portion 328 to be received thereby. In particular, the connecting portion(s) 338 are coupled to and/or engage a distal area of the first portion 328 at or near an outer radius of the first portion 328. In some examples, the connecting portion(s) 338 are radially distributed relative to the first axis 208, which improves torque distributed on the first portion 328 from the clutch 306.

To change the state of the clutch 306, the piston 334 of FIG. 3 is configured to move along the first axis 208 relative to (e.g., toward and/or away from) the clutch plate 336 to engage and disengage the clutch plate 336. For example, the controller of the vehicle 100 controls the actuator system to impart a force on the piston 334, which causes the piston 334 to move. In this manner, the clutch 306 squeezes and/or clamps the clutch plate 336 between the piston 334 and the cover 202, thereby transferring torque from the cover 202 to the first portion 328 of the first damper assembly 300. As such, when the clutch 306 is in the engaged state, the cover 202, the clutch plate 336, first portion 328, and the first gear 322 rotate cooperatively.

The second portion 330 of the first damper assembly 300 includes one or more example connecting portions (e.g., protrusions and/or tabs) 340 extending away from a surface (e.g., an outer surface) 342 of the second portion 330 toward a surface (e.g., an outer surface) 344 of the turbine 308, one of which is shown in this example. In particular, the connecting portion(s) 340 of FIG. 3 fixedly couple the turbine 308 to the second portion 330 such that turbine 308 and the second portion 330 rotate cooperatively during operation of the torque converter 200. For example, each of the connecting portions 340 has an example lip 341 that extends over and engages the surface 344 of the turbine 308. As such, the toque generated by the turbine 308 is imparted on and/or otherwise provided to the second portion 330 and/or the second gear(s) 324 via the connecting portion(s) 340. Additionally, when the clutch 306 is in the engaged state, the second portion 330 imparts at least a portion of the engine torque on the turbine 308 such that the impeller 204 and the turbine 308 rotate at substantially the same speed, which improves efficiency of the torque converter 200 by reducing fluid drag experienced by the turbine 308 and/or the impeller 204. That is, in some such examples, the turbine 308 rotates cooperatively with the cover 202 and/or the impeller 204.

To relatively rotatably couple the third portion 332 to the turbine 308, the first damper assembly 300 also includes a first example annular body (e.g., a plate or disc) 346 interposed between the third portion 332 and the turbine 308. For example, as shown in FIG. 3, the first damper assembly 300 includes one or more example fasteners (e.g., bolt(s), screw(s), rivet(s), etc.) 347 (one of which is shown in this example) extending through the turbine 308 and the first annular body 346, thereby coupling the turbine 308 and the first annular body 346 together. As such, the turbine 308 and the first annular body 346 rotate cooperatively. In particular, a surface (e.g., an outer circumferential surface) 348 of the third portion 332 slidably engages a surface (e.g., an inner circumferential surface) 350 of the first annular body 346, which supports the third gear 326 and the third portion 332 and/or helps maintain a proper position of the third gear 326 and the third portion 332 during operation of the torque converter 200. Further, in some examples, to facilitate lubrication for such moving components, the first annular body 346 includes one or more example grooves 352 positioned on and/or formed by the surface 350 of the first annular body 346, one of which is shown in this example. The groove(s) 352 may be radially distributed relative to the first axis 208. In particular, the groove(s) 352 are configured to receive the fluid 310 and/or facilitate a flow of the fluid 310 between the third portion 332 and the first annular body 346, which provides and/or improves lubrication as well as reduces and/or eliminates friction. That is, in some examples, the fluid 310 flows through one or more (e.g., all) of the groove(s) 352 to provide lubrication to at least the third portion 332 and the first annular body 346 during operation of the vehicle torque converter 200.

In some examples, to facilitate spring or damper operation (e.g., compressing the damping element(s) 304, 305), the second portion 330 of FIG. 3 includes one or more example cavities 354 (sometimes referred to as spring cavities) in which respective ones of the damping element(s) 304, 305 are positioned, one of which is shown in this example. As shown in FIG. 3, one of the primary damping elements 304 and one of the secondary damping elements 305 are positioned in one of the cavities 354. In particular, as the damping element(s) 304, 305 are compressed during operation of the torque converter 200 (e.g., via the protrusion(s) 410 (shown in FIG. 4) associated with the first portion 328), surfaces (e.g., inner surfaces) 356 of the second portion 330 defining respective ones of the cavities 354 engage the primary damping element(s) 304, thereby guiding movement of the damping element(s) 304, 305 and/or preventing buckling thereof.

In some examples, the second portion 330 includes a second example annular body (e.g., a plate or disc) 358 and a third example annular body (e.g., a plate or disc) 360 coupled to the second annular body 358, as shown in FIG. 3. For example, the second portion 330 includes one or more example fasteners (e.g., bolt(s), screws, rivet(s), etc.) 362 (one of which is shown in this example) extending through the second and third annular bodies 358, 360, thereby coupling the second and third annular bodies 358, 360 together. The fastener(s) 362 may be radially distributed relative to the first axis 208. In particular, in such examples, the first and second annular bodies 358, 360 form and/or define the cavities 354. Further, the second annular body 358 includes the surface 342. Although the example of FIG. 3 depicts the cavities 354 provided by the second and third annular bodies 358, 360, in some examples, one or more (e.g., all) of the cavities 354 are formed and/or defined differently. For example, the second portion 330 may include one or more fewer, additional, and/or different components other than the annular bodies 358, 360 that provide the cavities 354.

Figure 7:
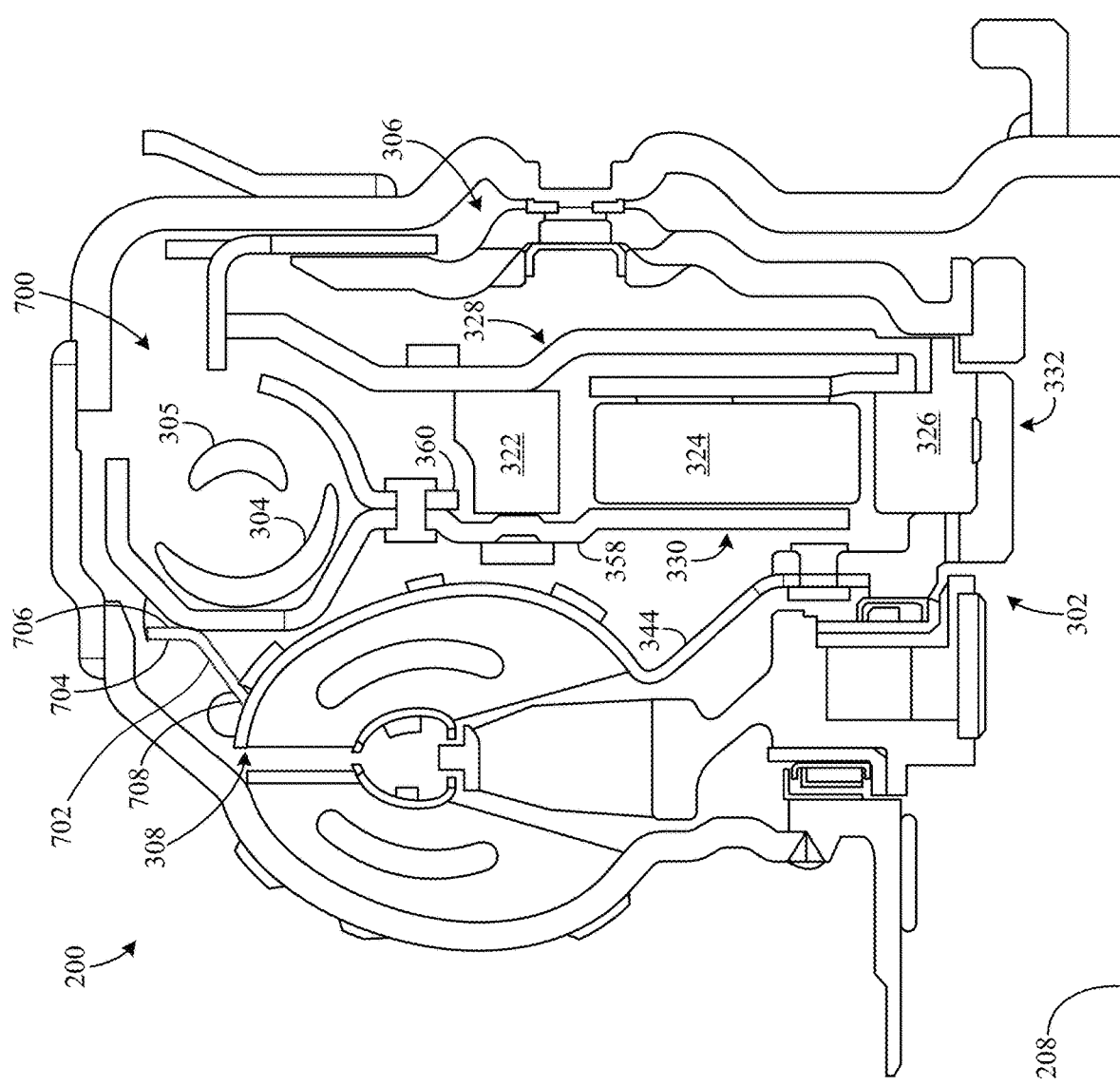
FIG. 7 is another partial cross-sectional view of the example torque converter of FIG. 2 along line A-A and shows a second example damper assembly in accordance with the teachings of this disclosure.
Figure 8:
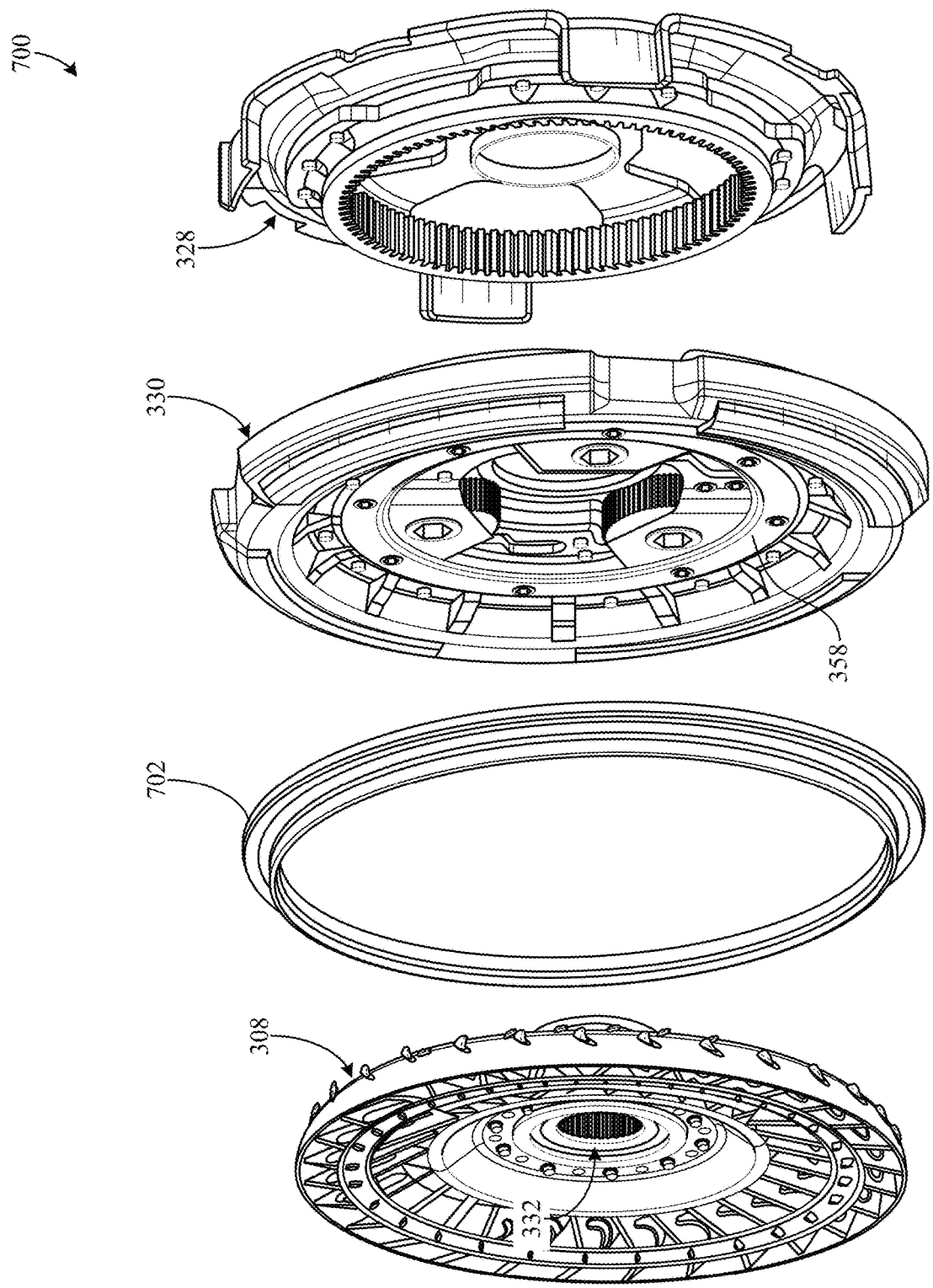
FIG. 8 is an exploded view of the second example damper assembly of FIG. 7.
Figure 9:
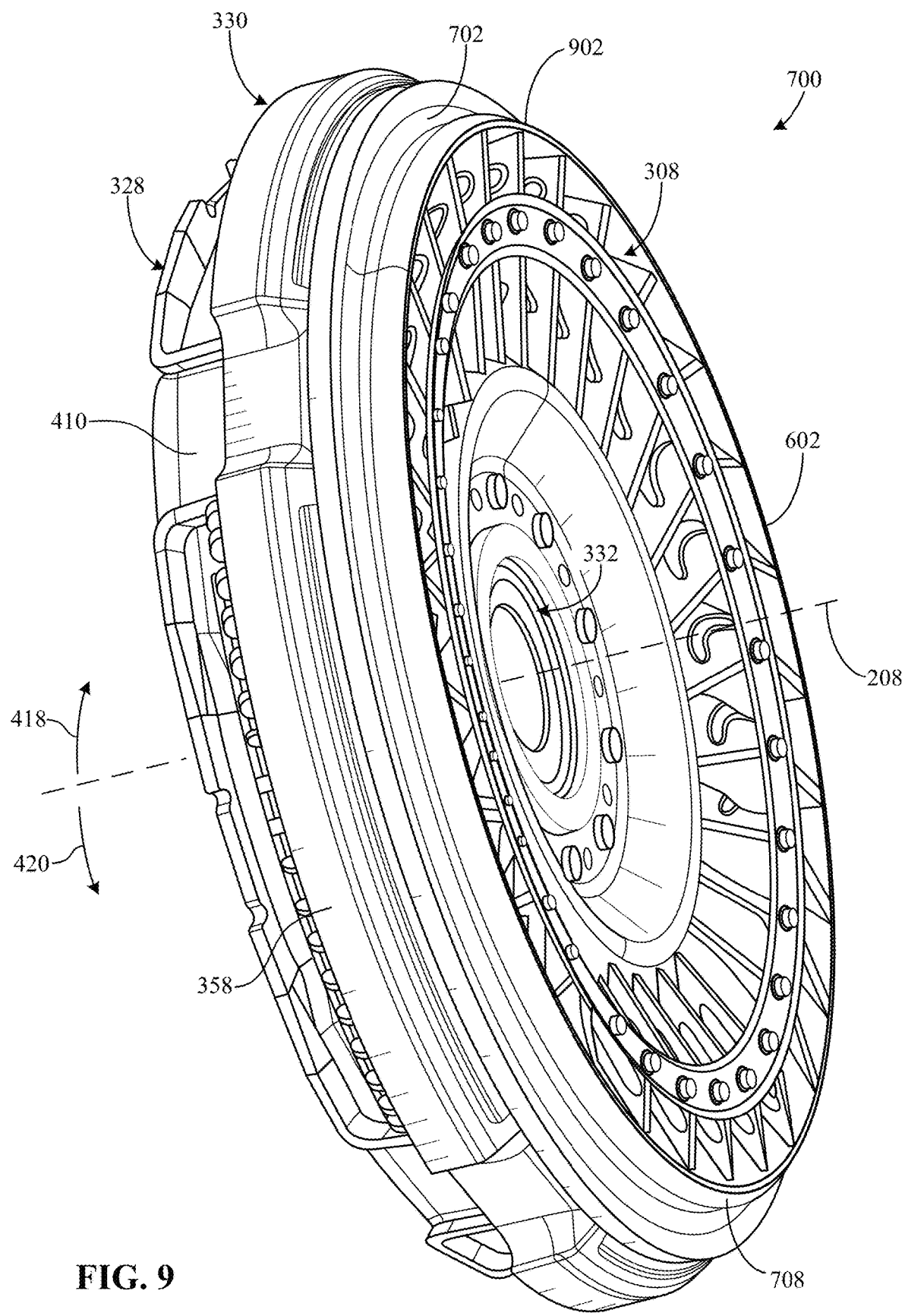
FIG. 9 is an assembled view of the second example damper assembly of FIG. 7.
Figure 12:
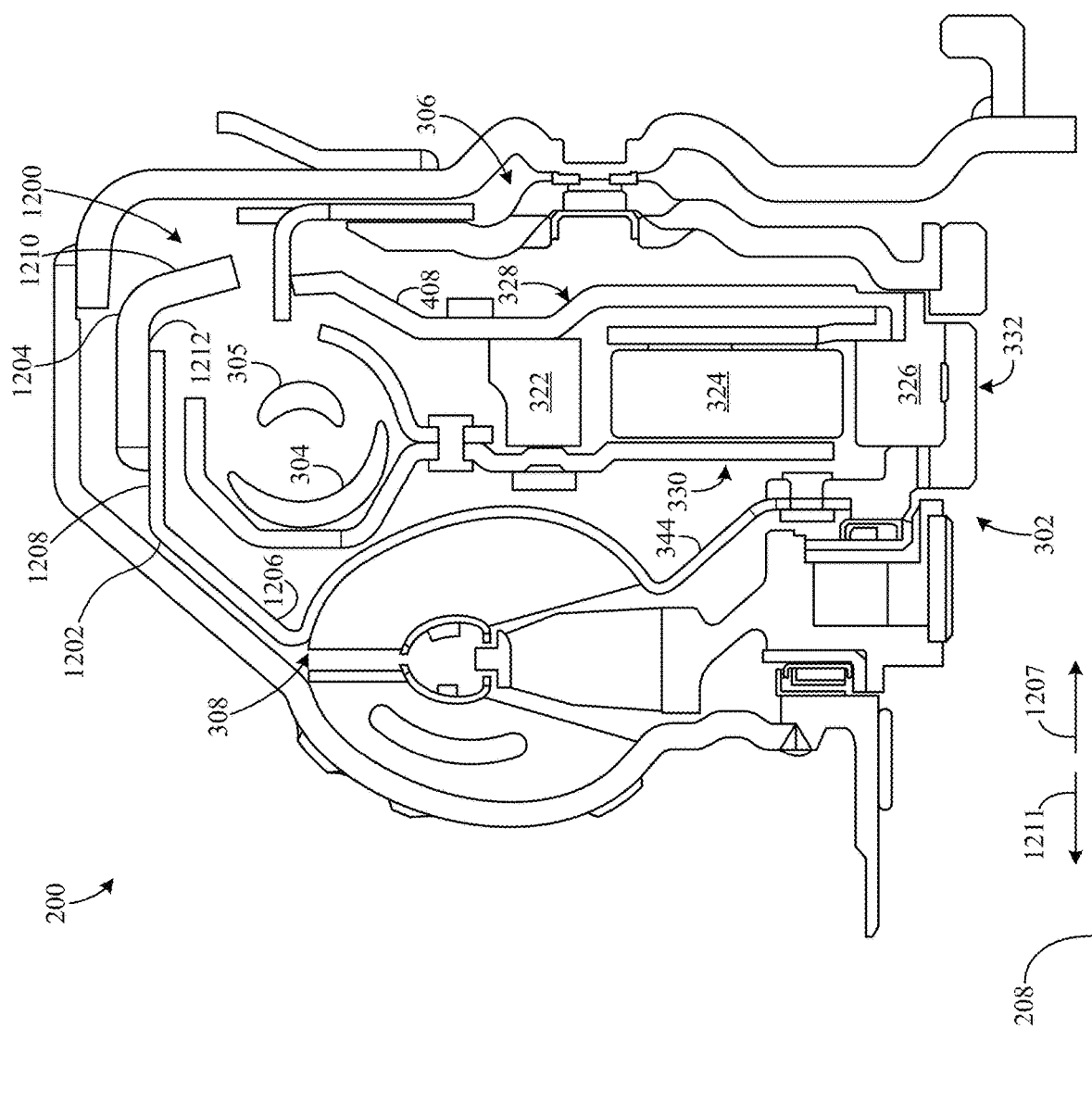
FIG. 12 is another partial cross-sectional view of the example torque converter of FIG. 2 along line A-A and shows a third example damper assembly in accordance with the teachings of this disclosure.
Figure 13:
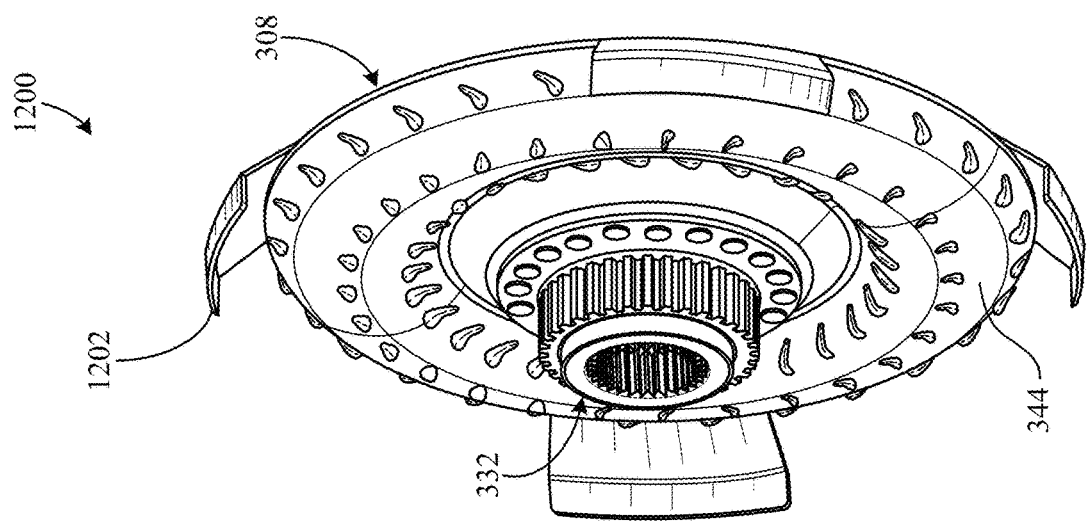
FIG. 13 is an exploded view of the third example damper assembly of FIG. 12.
Figure 13:
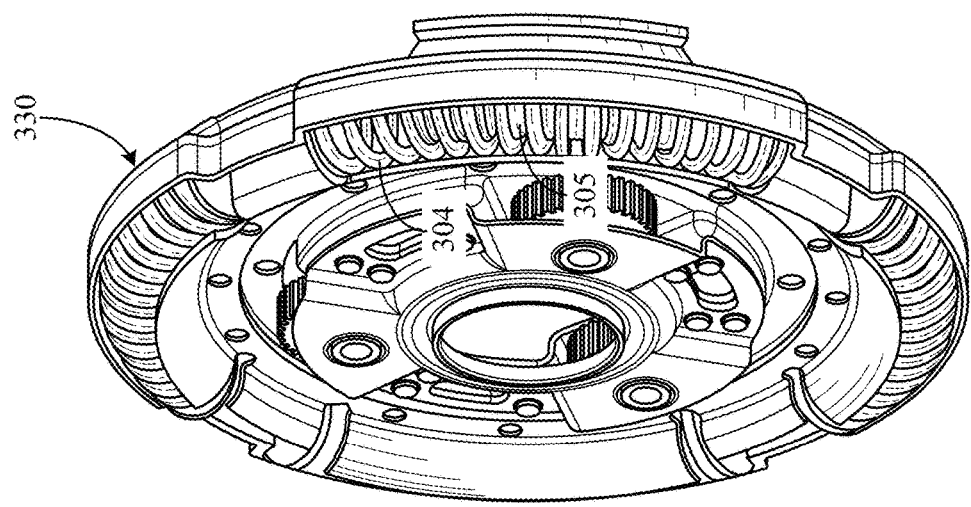
Figure 13:
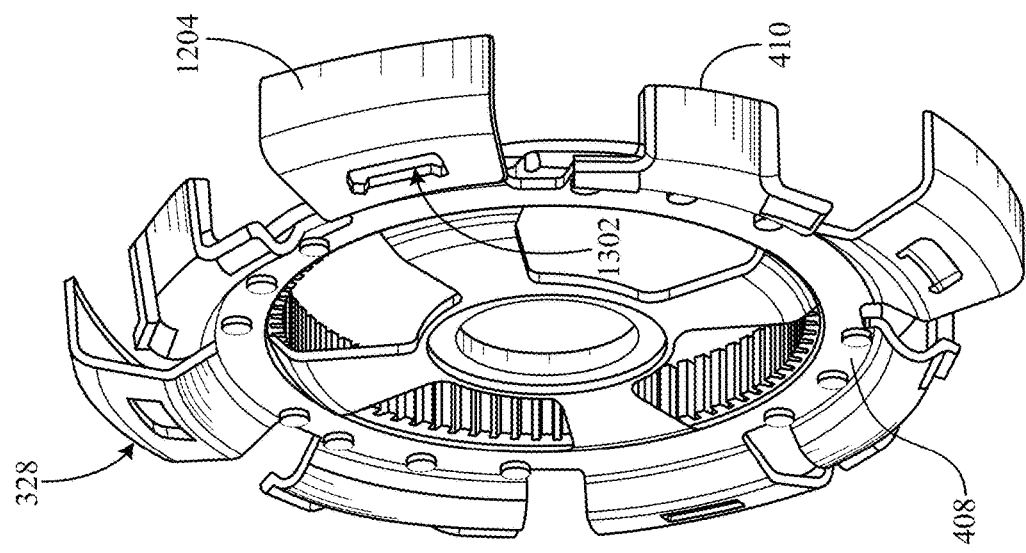
Figure 14:
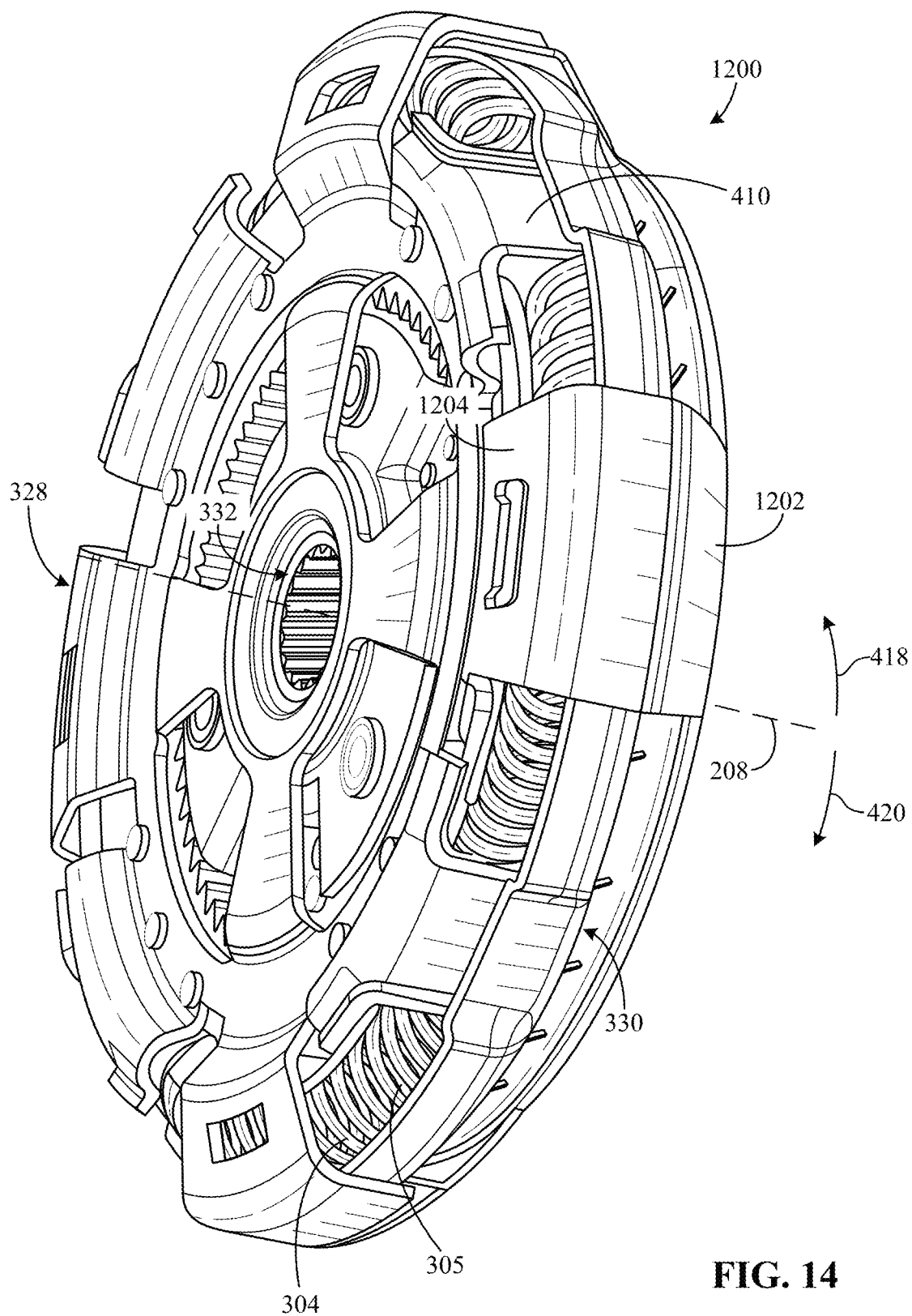
FIG. 14 is an assembled view of the third example damper assembly of FIG. 12.

Although FIG. 3 depicts particular aspects in connection with the first damper assembly 300, in some examples, such aspects likewise apply to one or more other disclosed damper assemblies such as, for example, the second damper assembly 700 of FIGS. 7-9 and/or the third damper assembly 1200 of FIGS. 12-14.

Figure 4:
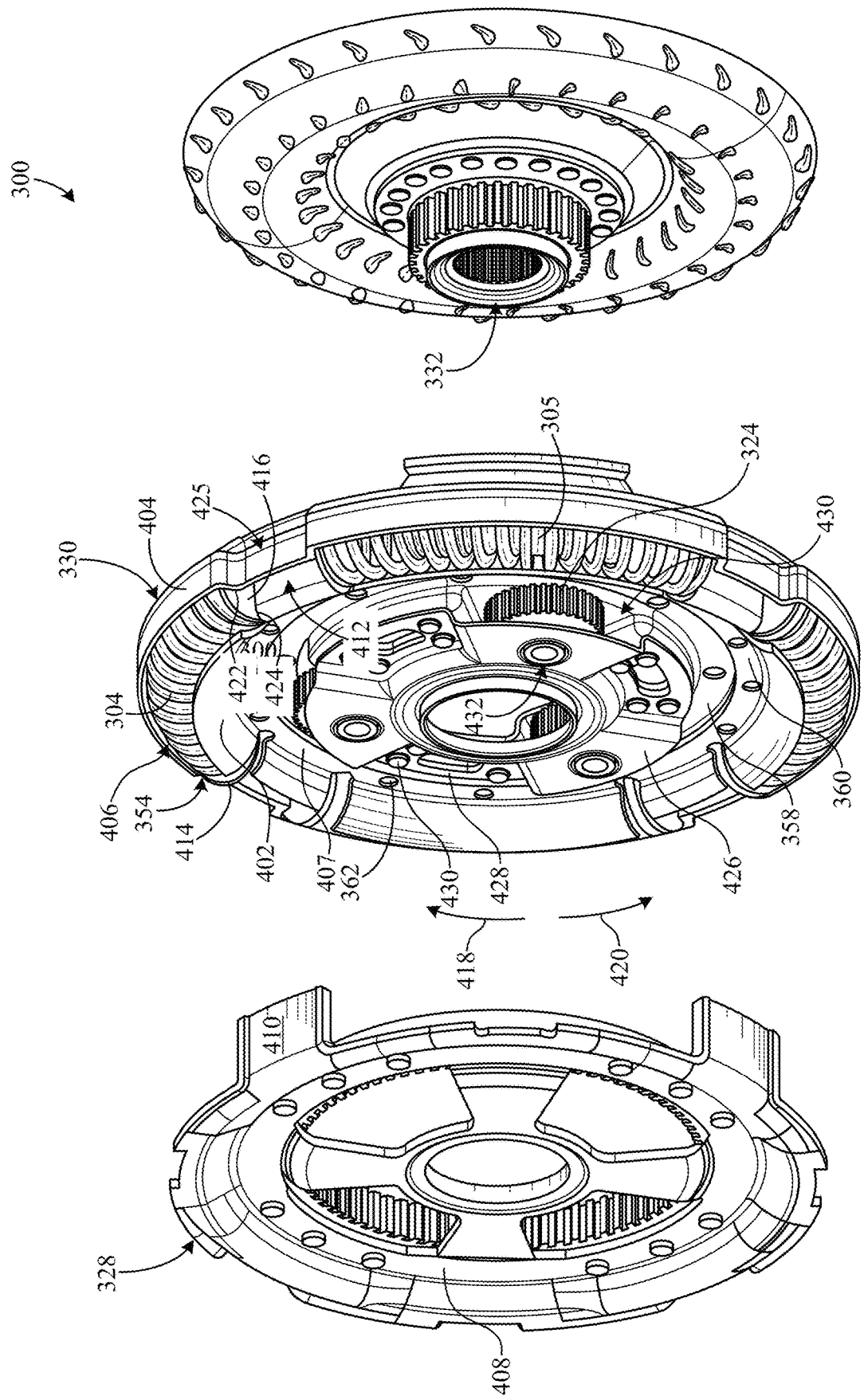
FIGS. 4 and 5 are exploded views of the first example damper assembly of FIG. 3.
Figure 5:
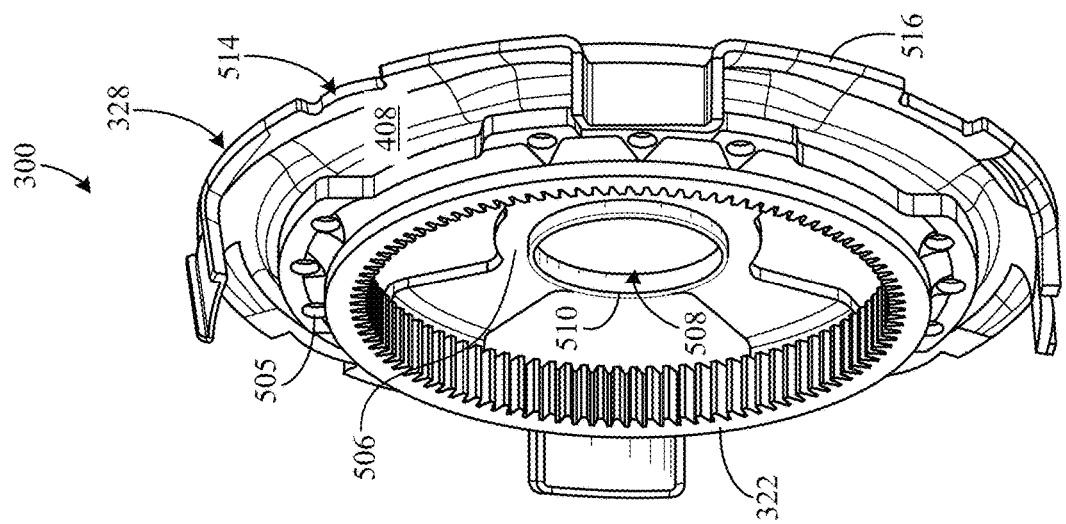
Figure 5:
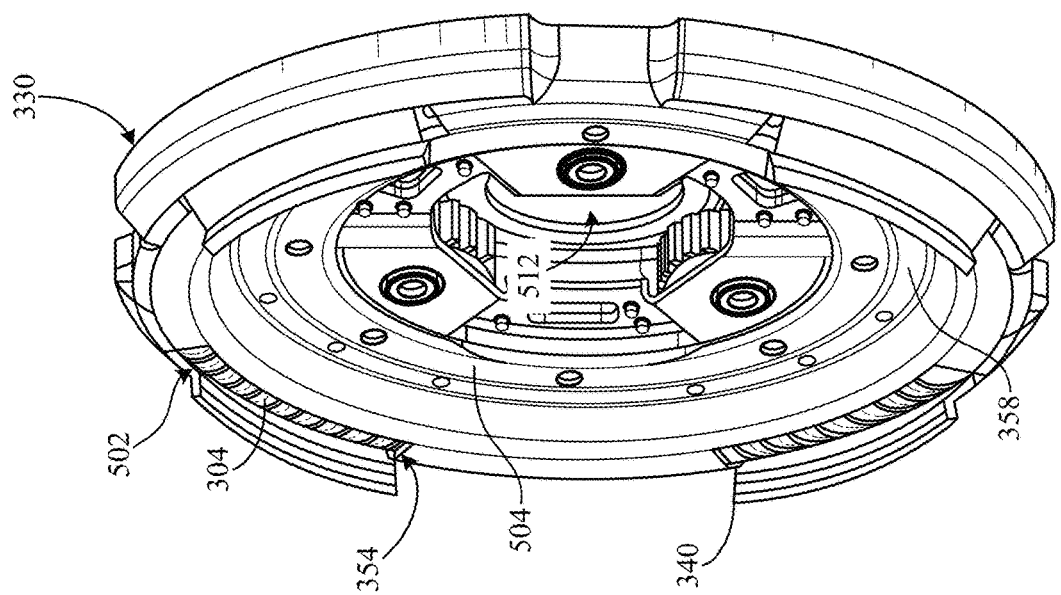
Figure 5:
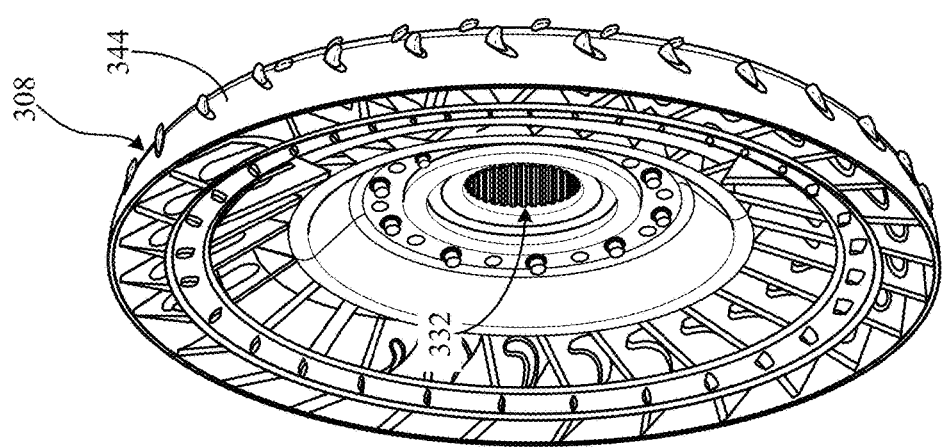

FIGS. 4 and 5 are exploded views of the first example damper assembly 300 of FIG. 3. As shown in FIGS. 4 and 5, the first, second, and third portions 328, 330, 332 of the first damper assembly 300 are separated from each other. According to the illustrated example of FIG. 4, the second portion 330 includes four of the cavities 354, each of which is positioned at or near and/or extends along a radius (e.g., an outermost radius) of the second portion 330. As such, in this example, the second portion 330 includes four of the primary damping elements 304 and four of the secondary damping elements 305, each of which is positioned in a respective one of the cavities 354. However, in some examples, the second portion 330 includes one or more fewer, additional, and/or different cavities 354 and/or damping elements 304, 305. For clarity, aspects associated with a single or first one of the cavities 354, a single or first one of the primary damping elements 304, and a single or first one of the secondary damping elements 305 may be discussed in connection with FIG. 4. However, such aspects likewise apply to one or more (e.g., all) of the other damping elements 304, 305 and/or one or more (e.g., all) of the other cavities 354.

As shown in FIG. 4, the second and third annular bodies 358, 360 have respective curved and/or angled portions 402, 404 (i.e., a first curved and/or angled portion 402 and a second curved and/or angled portion 404), each of which curves and/or extends partially around respective ones of the primary damping elements 304. The curved and/or angled portions 402, 404 of FIG. 4 form and/or define an example first opening 406 in each spring cavity 354 that is positioned a first side 407 of the second portion 330, which exposes the damping element(s) 304, 305 and/or allows access into the cavities 354 by the first portion 328 of the first damper assembly 300. In particular, the first portion 328 includes a fourth example annular body (e.g., a plate or disc) 408 and one or more of the aforementioned protrusions (e.g., tabs) 410 coupled to and/or positioned on the fourth annular body 408, two of which are shown in this example. As shown in FIG. 4, the protrusions 410 are positioned at or near and/or distributed along a radius (e.g., an outermost radius) of the fourth annular body 408. More particularly, the protrusions 410 of FIG. 4 are sized, shaped, structured, and/or otherwise configured to compress and/or decompress respective ones of the damping element(s) 304, 305 during operation of the torque converter 200 when the clutch 306 is in the engaged state, as discussed further below. Each of the protrusions 410 curves and/or extends away from the fourth annular body 408 to be received in a respective space 412 defined between adjacent ones of the primary damping elements 304.

According to the illustrated example of FIG. 4, the second portion 330 of the first damper assembly 300 includes first and second (i.e., a pair of) example seats (e.g., annular bodies such as plates or discs) 414, 416 (sometimes referred to as spring seats) associated with each cavity 354. For example, the first seat 414 is positioned in the first one of the cavities 354 at or near a first end of the first one of the cavities 354 proximate to the first one of the primary damping elements 304. Further, the second seat 416 is positioned in the first one of the cavities 354 at or near a second end, opposite the first end, of the first one of the cavities 354 proximate to the first one of the primary damping elements 304. In particular, the spring seats 414, 416 are sized, shaped, structured, and/or otherwise configured to move through respective ones of the cavities 354 to facilitate changing a state of the damping element(s) 304, 305. In some examples, a first one of the protrusions 410 extends away from the fourth annular body 408 at least partially into the first one of the cavities 354. In such examples, the first one of the protrusions 410 is configured engage and/or impart a force on the first spring seat 414 (e.g., resulting from rotation of the first portion 328 relative to the second portion 330), thereby urging and/or moving the first spring seat 414 through the first one of the cavities 354 toward the second spring seat 416 in a first rotational direction (e.g., clockwise or counterclockwise) 418 relative to the first axis 208. As result of such movement of the first one of the protrusions 410 and the first spring seat 414 (and/or one or more of the other spring seats), the first ones of the primary and secondary damping elements 304, 305 compress. In this manner, the protrusions 410 and the spring seats 414, 416 compress the damping elements 304, 305.

Further, in response to such compression, the damping elements 304, 305 urge and/or move the first spring seat 414 through the first one of the cavities 354 away from the second spring seat 416 in a second rotational direction 420, opposite the first rotational direction 418, relative to the first axis 208. As a result of such movement of the protrusion 410 and the first spring seat 414 (and/or one or more of the other spring seats), the damping elements 304, 305 decompress. In this manner, the protrusions 410 and the spring seats 414, 416 decompress the primary damping elements 304.

In some examples, to limit movement of the springs seats 414, 416 through the cavities 354, the second portion 330 includes one or more example travel stops 422, 424 for each of the spring seats 414, 416, two of which are shown in this example for the second spring seat 416 (i.e., a first example travel stop 422 and a second example travel stop 424). In particular, the travel stops 422, 424 are sized, shaped, structured, and/or otherwise configured to engage a first side or surface of the second spring seat 416 opposite to a second side or surface of the second spring seat 416 that engages the damping element(s) 304, 305. In this manner, the travel stops 422, 424 prevent the primary damping elements 304 from over extending. In some examples, the travel stops 422, 424 are coupled to and/or defined by the second and third annular bodies 358, 360. That is, the travel stops 422, 424 may be integral with the second portion 330 or may be components separate from the second portion 330. For example, as shown in FIG. 4, the first travel stop 422 is formed and/or defined by a particular area (e.g., a recessed area) 425 of the second annular body 358 that extends radially inward relative to the first axis 208 such that an inner surface of the second curved and/or angled portion 404 overlaps with the second spring seat 416. Similarly, as shown in FIG. 4, the second travel stop 424 is formed and/or defined by a particular area (e.g., a protruding area) of the third annular body 360 that extends radially outward relative to the first axis 208 such that an inner surface of the first curved and/or angled portion 402 overlaps with the second spring seat 416.

As shown in FIG. 4, the second portion 330 includes three of the second gears 324 that are relatively rotatably coupled to the second annular body 358 and distributed along a radius (e.g., an innermost radius) of the second annular body 358, which improves torque capacity and/or torque distribution of the first damper assembly 300 compared to a single second gear. According to the illustrated example of FIG. 4, the second portion 330 includes a fifth example annular body (e.g., a plate or disc) 426 to facilitate carrying the second gears 324. The fifth annular body 426 includes one or more flange portions 428 (three of which are shown in this example) that are configured to couple to the second annular body 358, for example, via one or more fasteners 430 extending through the flange portions 428 and respective protruding surfaces of the second annular body 358 on which each flange portion 428 is positioned. Each flange portion 428 defines a recessed area on the fifth annular body 426 adjacent to a protruding area on the fifth annular body 426. In particular, each of the second gears 324 is interposed between the second annular body 358 and the fifth annular body 426. That is, each of the second gears 324 is positioned in an example space 430 formed and/or defined by the second and fifth annular bodies 358, 426. As shown in FIG. 4, each of the second gears 324 is relatively rotatably coupled to the second portion 330 via an example bearing (e.g., a ball bearing) 432 that extends through the fifth annular body 426, the second gear 324, and the second annular body 358.

As shown in FIG. 4, the secondary damping elements 305 are positioned within respective ones of the primary damping elements 304. Further, as shown in FIG. 4, the fasteners 362 associated with coupling the second and third annular bodies 358, 360 are positioned at or near and/or distributed along a radius (e.g., an innermost radius) of the third annular body 360.

According to the illustrated example of FIG. 5, the second annular body 358 includes second openings 502 that are positioned on a second side 504 of the second portion 330, opposite the first side 407, and extend along respective ones of the cavities 354, which exposes the primary damping elements 304. In particular, the first and second openings 406, 502 improve damping performance by allowing the primary damping elements 304 to compress to a greater degree without being restricted by the surface(s) 356 defined by the cavities 354, which would have otherwise been unattainable without the openings 406, 502 or would require the cavities 354 to have a greater size.

As shown in FIG. 5, the second portion 330 includes four of the aforementioned connecting portions 340 for coupling the second portions 328 and the turbine 308 together. In particular, the connecting portions 340 of FIG. 5 are positioned at or near and/or distributed along a radius (e.g., an outermost radius) of the second portion 330. In some examples, the connecting portions 340 are configured to couple (e.g., via welding) to the surface 344 of the turbine 308. Although FIG. 5 depicts multiple connecting portions 340, in some examples, the first and second portions 328, 330 are coupled together via a single-piece component, which is discussed further below in connection with FIGS. 7-9.

As shown in FIG. 5, the first gear 322 is positioned on and coupled to the fourth annular body 408 of the first portion 328. For example, one or more example fasteners 505 are positioned at or near and/or distributed along a radius (e.g., an outermost radius) of the first gear 322 and extend through the first gear 322 and the fourth annular body 408, thereby coupling the first gear 322 to the fourth annular body 408. In some examples, the fourth annular body 408 includes a central portion 506 forming and/or defining an example opening 508. In particular, the opening 508 is configured to at least partially receive the third portion 332 and/or the third gear 326, which facilitates maintaining a position of the third portion 332 and/or the third gear 326 during operation of the torque converter 200. In such examples, the first portion 328 includes an example lip 510 positioned on the central portion 506 and extending around the opening 508. The lip 510 extends away from the central portion 506 and configured to be received by an opening 512 positioned on the second portion 330 and slidably engage the third portion 332.

In some examples, to facilitate coupling the first damper assembly 300 (and/or the second damper assembly 700 of FIG. 7) to the clutch 306, the first portion 328 includes one or more recessed areas (e.g., slots, grooves, etc.) 514 positioned on the fourth annular body 408, four of which are shown in this example. The recessed areas 514 of FIG. 5 are positioned at or near and/or distributed along a radius (e.g., an outermost radius) of the fourth annular body 408. In some examples, the fourth annular body 408 includes an edge (e.g., a circumferential edge) 516 that forms and/or defines the recessed areas 514, as shown in FIG. 5. In particular, the recessed areas 514 are configured to receive respective ones of the connecting portions 338 of the clutch plate 336, thereby coupling the clutch 306 to the first portion 328. As such, when the clutch 306 is engaged, the first portion 328, the clutch plate 336, and the cover 202 rotate cooperatively resulting from the connecting portions 338 engaging surfaces of the fourth annular body 408 defined by the respective recessed areas 514.

Figure 6:
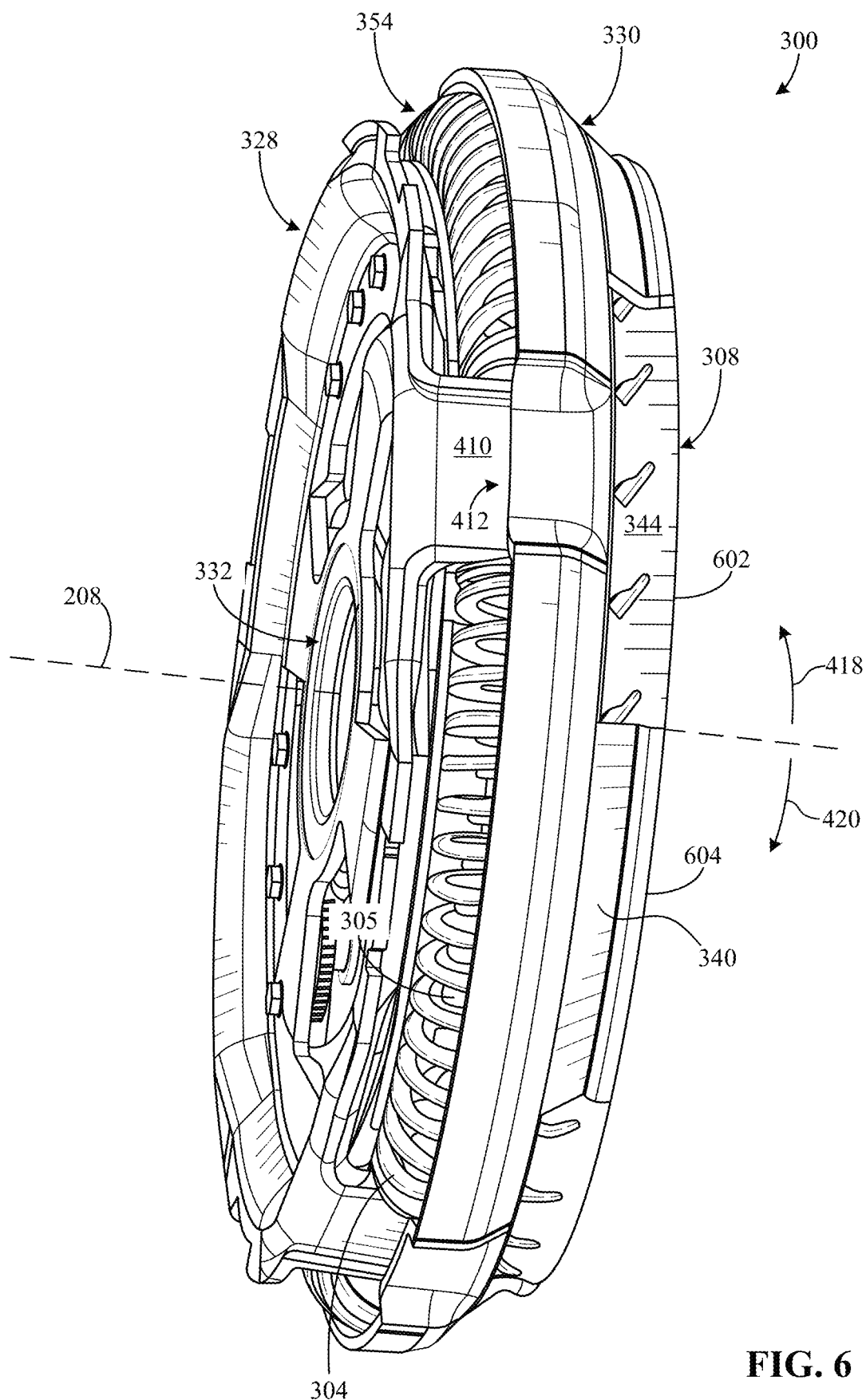
FIG. 6 is an assembled view of the first example damper assembly of FIG. 3.

FIG. 6 is an assembled view of the first example damper assembly 300 of FIG. 3. That is, the first, second, and third portions 328, 330, 332 are assembled.

As illustrated in FIG. 6, the protrusions 410 of the first portion 328 are positioned in respective ones of the spaces 412 such that the protrusions 410 can engage the seats 414, 416. In particular, during operation of the torque converter 200 when the clutch 306 is in the engaged state, the first portion 328 rotates relative to the second portion 330 about the first axis 208 in the first rotational direction 418 and/or the second rotational direction 420, thereby compressing and decompressing the primary damping elements 304 and/or the secondary damping elements 305. That is, the protrusions 410 move through the cavities 354 across a distance, which is sometimes referred to as damper travel. In this manner, the first damper assembly 300 provides a damping effect via the damping element(s) 304, 305, which absorbs torsional vibrations and/or sudden movements generated by the engine 102 that would have otherwise been provided to the third portion 332 and, thus, to the first shaft 206. For example, rotation of the first portion 328 relative to the second portion 330 compresses and decompresses the primary damping element(s) 304 and/or the secondary damping element(s) 305 to dampen one or more torsional vibrations associated with the engine torque received by the first portion 328. As a result, the first damper assembly 300 dampens movement between the cover 202 and the first shaft 206. In particular, an amount or a degree of the damper travel of the first damper assembly 300 is based on the gear ratios defined by the first, second, and third gears 322, 324, 326. In some examples, the gear ratios are configured such that the damper travel is substantially longer (e.g., several times longer) than a length of the secondary damping element(s) 305.

In some examples, a ratio defined by the first gear 322 and the third gear 326 is substantially between 2 and 6, which extends the damper travel and also decreases stiffness of the damping element(s) 304, 305. That is, torque transferred from the first gear 322 to the third gear 326 increases based on the ratio. In particular, engine torque experienced by the damping element(s) 304, 305 also increases based on the ratio. For example, when the ratio is configured to 3.5, the first gear 322 receives a first torque (i.e., an engine torque) (e.g., about 500 newton meters (Nm)) from the clutch plate 336 and, in response, the damping element(s) 304, 305 receive a second torque (e.g., about 1750 Nm) from the protrusion(s) 410 greater than the first torque based on the ratio. Additionally, a stiffness of the damping element(s) 304, 305 decreases based on the ratio. In such examples, the ratio is configured based on one or more of a target stiffness of the damping element(s) 304, 305, a target torque capacity of the damping element(s) 304, 305, and/or packaging requirements of the first damper assembly 300.

In some examples, an edge (e.g., a circumferential edge) 602 of the turbine outer surface 344 is substantially aligned to edges (e.g., circumferential edges) 604 of respective ones of the connecting portions 340. As such, in such examples, the connecting portions 340 are sized, shaped, and/or formed to conform to the surface 344 of the turbine 308, which facilitates coupling the second portion 330 to the turbine 308 via the connecting portions 340.

FIG. 7 is another partial cross-sectional view of the example torque converter 200 of FIG. 2 along line A-A and shows a second example damper assembly 700 in accordance with the teachings of this disclosure. Similar to the first damper assembly 300 of FIG. 3, the second damper assembly 700 includes the primary damping element(s) 304, the secondary damping element(s) 305, and the gear system 302, which includes the first gear 322, the second gear(s) 324, and third gear 326. Further, the second damper assembly 700 also includes the first portion 328, the second portion 330, and the third portion 332 that form a gear train operatively coupled and/or interposed between the turbine 308, the clutch 306, and the first shaft 206 to transfer torque therebetween. However, unlike the first damper assembly 300, the second damper assembly 700 includes a single connecting portion (e.g., a ring, a plate or disc, etc.) 702 instead of the multiple connecting portions 340. The single connecting portion 702 is a component separate from both the turbine 308 and the second annular body 358 of the second portion 330, which is then coupled to the turbine 308 and the second annular body 358. That is, the connecting portion 702 is sized, shaped, structured, and/or otherwise configured to couple the turbine 308 and the second annular body 358 together, for example, via one or more fasteners and/or one or more fastening methods or techniques (e.g., welding). As shown in FIG. 7, the connecting portion 702 is interposed between the turbine 308 and the second annular body 358. In some examples, the connecting portion 702 is a ring (e.g., a continuous or discontinuous ring), as better shown below in FIG. 8.

In some examples, the connecting portion 702 of FIG. 7 includes a first portion 704 defining a relatively flat or smooth surface (e.g., an annular surface) 706, as shown in FIG. 7. Additionally, the connecting portion 702 includes a second portion 708 that extends away from the first portion 704 radially inward relative to the first axis 208 to engage the surface 344 of the turbine 308. As shown in FIG. 7, the first portion 704 and the second portion 708 of the connecting portion 702 are angled relative to each other. That is, outer surfaces of the respective first and second portions 704, 708 form and/or define an example angle (e.g., between about 90 degrees and about 150 degrees) therebetween. In some examples, the turbine 308, the second annular body 358, the third annular body 360, and the connecting portion 702 are substantially coaxially aligned, as shown in this example.

FIG. 8 is an exploded view of the second example damper 700 assembly of FIG. 7. As shown in FIG. 8, the first portion 328, the second portion 330, the third portion 332, and the single connecting portion 702 of the second damper assembly 700 are separated from each other. According to the illustrated example of FIG. 8, the connecting portion 702 is configured to be received by the turbine 308 and the second annular body 358. When properly positioned on and/or aligned to the turbine 308 and the second annular body 358, the turbine 308 and the second annular body 358 are then coupled together via the connecting portion 702.

FIG. 9 is an assembled view of the second example damper 700 assembly of FIG. 7. That is, the first, second, and third portions 328, 330, 332 are assembled. Operation of the second damper assembly 700 of FIG. 9 is similar to the operation of the first damper assembly 300 of FIG. 6. For example, during operation of the torque converter 200 when the clutch 306 is in the engaged state, the first portion 328 rotates relative to the second portion 330 about the first axis 208 in the first rotational direction 418 and/or the second rotational direction 420, thereby compressing and decompressing, via the protrusion(s) 410, the primary damping elements 304 and/or the secondary damping elements 305. According to the illustrate example of FIG. 7, the connecting portion 702 extends around and/or proximate to radii (e.g., outermost radii) of the turbine 308 and the second annular body 358. In some examples, an edge (e.g., a circumferential edge) 902 of the second portion 708 of the single connecting portion 702 is substantially aligned to the edge 602 of the turbine 308, as shown in FIG. 9. Accordingly, in such examples, the single connecting portion 702 is sized, shaped, and/or formed to conform to the surface 344 of the turbine 308, which facilitates coupling the second portion 330 to the turbine 308 via the connecting portions 340.

Figure 10:
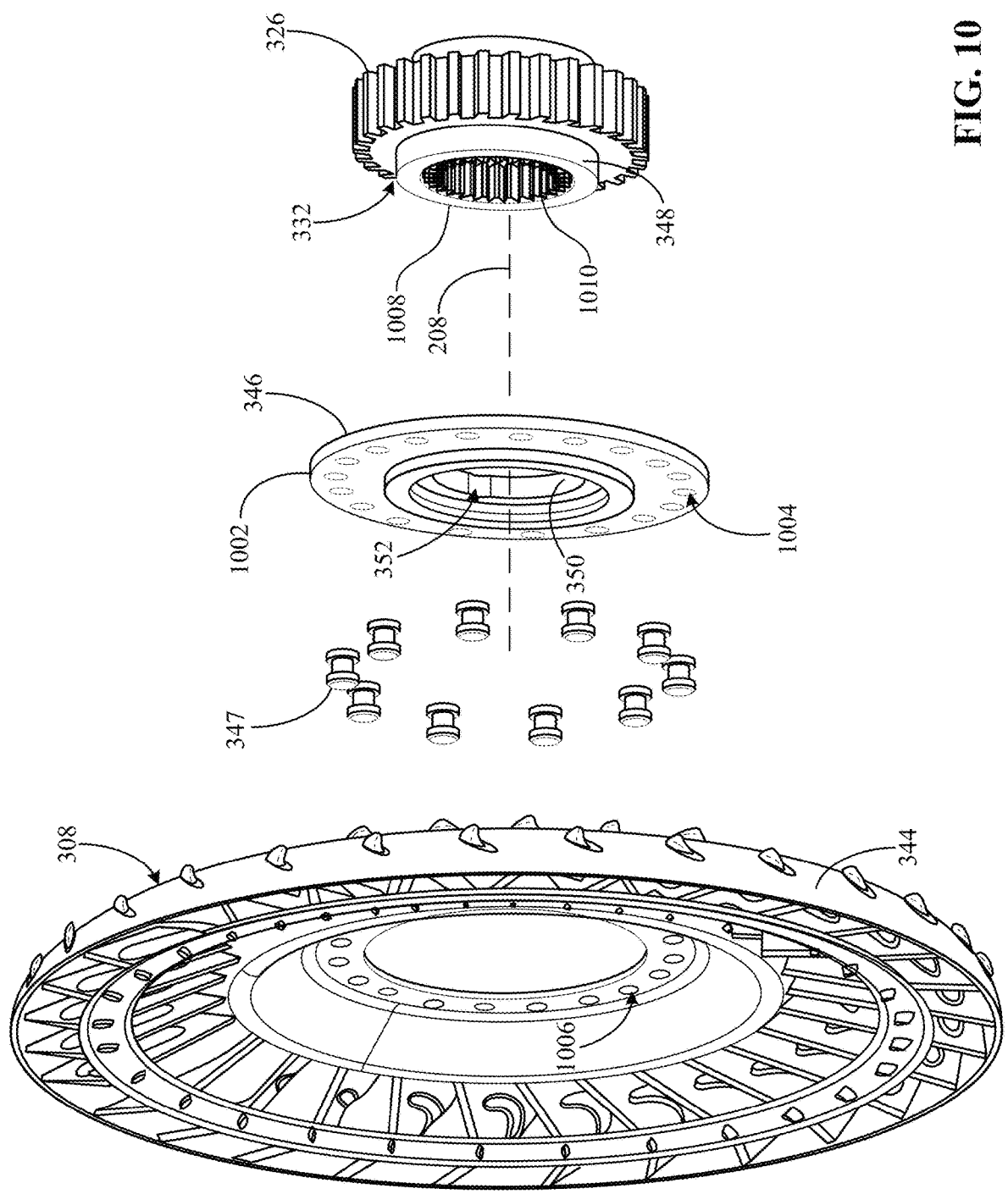
FIG. 10 is a partial exploded view of an example turbine in accordance with the teachings of this disclosure.

FIG. 10 is a partial exploded view of the turbine 308 of FIGS. 3-9. As shown in FIG. 10, the turbine 308, the first annular body 346, and the third portion 332 of the damper assemblies 300, 700 are separated from each other. According to the illustrated example of FIG. 10, the first annular body 346 includes a flange portion 1002 that extends radially outward relative the first axis 208. In particular, the flange portion 1002 is configured to couple the first annular body 346 to the turbine 308. As shown in FIG. 10, the flange portion 1002 has openings 1004 positioned thereon and radially distributed relative to the first axis 208. Further, the turbine 308 has openings 1006 positioned on the surface 344 and radially distributed relative to the first axis 208, which are associated with the openings 1004 of the first annular body 346. The openings 1006 of the turbine 308 are positioned at or near a particular radius (e.g., an innermost radius) of the turbine 308. As such, when the flange portion 1002 is properly positioned on the surface 344 at the particular radius of the turbine 308, the openings 1004, 1006 align to each other. Then, the fasteners 347 pass through and/or are otherwise positioned in the openings 1004, 1006, thereby coupling the turbine 308 to the first annular body 346.

According to the illustrated example of FIG. 10, the third portion 332 includes a cylindrical body 1008 extending along the first axis 208 away from the third gear 326 to be received by the surface 350 of the first annular body 346. The cylindrical body 1008 is coupled (e.g., via welding) to the third gear 326 such that the cylindrical body 1008 and the third gear 326 rotate cooperatively. In particular, the cylindrical body 1008 of FIG. 10 includes a splined inner surface 1010 configured to receive a portion (e.g., a splined portion) of the outer surface 212 of the first shaft 206. In this manner, the third portion 332 couples to the first shaft 206 such that the third gear 326 and the first shaft 206 rotate cooperatively and torque can be transmitted thereby. As shown in FIG. 10, the first annular body 346 includes the surface 350 that is configured to slidably engage the surface 348 of the third portion 332. In this example, only one of the groove(s) 352 for facilitating lubrication is formed and/or defined by the surface 350.

Although FIG. 10 depicts the third portion 332 and the first annular body 346 in connection with the first damper assembly 300 and/or the second damper assembly 700, in some examples, the third portion 332 and the first annular body 346 are used to implement one or more other damper assemblies such as, for example, the third damper assembly 1200 of FIGS. 12-14.

Figure 11:
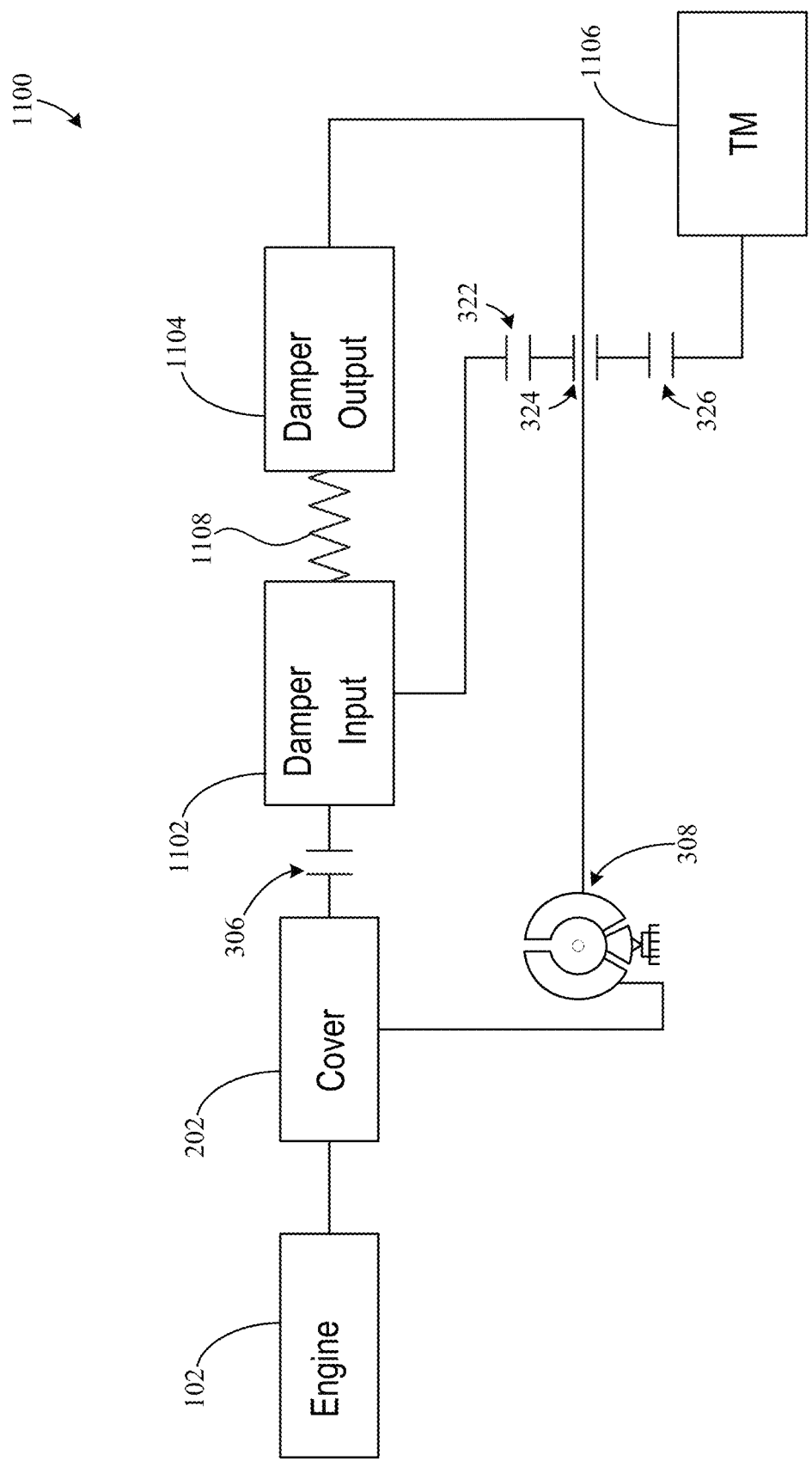
FIG. 11 is a schematic illustration of a first example damper configuration in accordance with the teachings of this disclosure.

FIG. 11 is a schematic illustration of a first example damper configuration 1100 in accordance with the teachings of this disclosure. In some examples, the first damper configuration 1100 is used to implement the first damper assembly 300 of FIGS. 3-6 and/or the second damper assembly 700 of FIGS. 7-9. According to the illustrated example of FIG. 11, the first damper configuration 1100 includes a first example damper input 1102 that is configured to connect to the cover 202, which is sometimes referred to as a primary side. In some examples, the cover 202 is configured to connect to the first gear 322 and/or the first portion 328, for example, via the clutch 306 and the fourth annular body 408. As such, the clutch 306 is operatively coupled to and/or interposed between the cover 202 and the first damper input 1102 to transfer torque from the engine 102 to the first damper input 1102 when the clutch 306 is engaged. That is, in such examples, the first damper input 1102 includes the first gear 322 and/or the first portion 328.

Further, the first damper configuration includes a first example damper output 1104 that is configured to connect to the turbine 308, which is sometimes referred to as a secondary side. In some examples, the turbine 308 is configured to connect to the second gear(s) 324 and/or the second portion 330, for example, via the connecting portion(s) 340, 702 and the second annular body 358. That is, in such examples, the first damper output 1104 includes the second gear(s) 324 and/or the second portion 330. As such, inertia of the turbine 308 affects and/or is input into the first damper output 1104 but not an example transmission (e.g., an automatic transmission system) 1106 system of the vehicle 100. In some examples, the second portion 330 is coupled to the turbine 308 such that the inertia of the turbine 308 affects and/or is input into the second portion 330. In such examples, as a result of such coupling, the turbine 308 increases a mass of the second portion 330. That is, a mass of the turbine 308 is added to the mass of the second portion 330. Additionally, the turbine 308 is configured to fluidly interact with and/or connect to the impeller 204 (which is coupled to the cover 202) to generate torque, via the fluid 310, when the clutch 306 is disengaged and the cover 202 is rotating. Further, the third gear 326 and/or the third portion 332 are configured to connect to the vehicle transmission system 1106 to provide engine output thereto, for example, via the first shaft 206 and the cylindrical body 1008.

The first damper configuration 1100 also includes a first example torsional vibration damper 1108 operatively coupled to and/or interposed between the first damper input 1102 and the first damper output 1104. In some examples, the first torsional vibration damper 1102 includes one or more of the primary damping elements 304 and/or the secondary damping elements 305. In particular, the third gear 326 provides torque to the transmission 1106 and/or otherwise controls output of the first shaft 206 based on a damping characteristic of the first torsional vibration damper 1108, such as stiffness and/or softness. Accordingly, one or more of the damping elements 304, 305 is/are sized, shaped, structured, and/or otherwise configured to provide the damping characteristic such that, when the clutch 306 is engaged, the third gear 326 receives substantially no torsional vibrations and/or sudden movements caused by the engine 102.

FIG. 12 is another partial cross-sectional view of the example torque converter 200 of FIG. 2 along line A-A and shows a third example damper assembly 1200 in accordance with the teachings of this disclosure. Similar to the first and second damper assemblies 300, 700, the third damper assembly 1200 includes the primary damping element(s) 304, the secondary damping element(s) 305, and the gear system 302, which includes the first gear 322, the second gear(s) 324, and third gear 326. Further, the third damper assembly 1200 also includes the first portion 328, the second portion 330, and the third portion 332 that form a gear train operatively coupled to and/or interposed between the turbine 308, the clutch 306, and the first shaft 206 to transfer torque therebetween. However, unlike the first and second damper assemblies 300, 700, the turbine 308 of FIG. 12 is coupled to part of the first portion 328 (e.g., the fourth annular body 408) via one or more first example connecting portions (e.g., protrusions, tabs, etc.) 1202 and/or one or more second example connecting portions 1204 such that the turbine 308 and the first gear 322 rotate cooperatively regardless if the clutch 306 is engaged. The first and second connecting portions 1202, 1204 are interposed between the turbine 308 and the fourth annular body 408. In particular, the first and second connecting portions 1202, 1204 are sized, shaped, structured, and/or otherwise configured to couple the turbine 308 and the fourth annular body 408 together, for example, via one or more fasteners and/or one or more fastening methods or techniques (e.g., welding).

In some examples, the surface 344 of the turbine 308 forms and/or defines the first connecting portion(s) 1202, as shown in FIG. 12. Additionally, in some examples, a surface of the fourth annular body 408 forms and/or defines the second connecting portion(s) 1204, as shown in FIG. 12. However, in some examples, the first connecting portion(s) 1202 and/or the second connecting portion(s) 1204 are separate from the turbine 308 and/or the fourth annular body 408. Further, in some examples, the first and second connecting portions 1202, 1204 form and/or define one or more single components. In any case, when coupled together, the first and second connecting portions 1202, 1204 extend from the turbine 308 to the fourth annular body 408.

In some examples, each of the first connecting portions 1202 includes an angled portion 1206 extending along the first axis 208 in a first direction 1207 away from the surface 344 of the turbine 308 radially outward relative to the first axis 208, as shown in FIG. 12. Further, in such examples, each of the first connecting portions 1202 also includes a mounting portion (e.g., having a relatively flat or smooth surface) 1208, adjacent a respective one of the angled portions 1206, that extend along the first axis 208 in the first direction 1207 away from the turbine 308 to be received by and couple to a respective one of the second connecting portions 1204. As shown in FIG. 12, the angled portion(s) 1206 and the respective mounting portions 1208 form and/or define an angle.

Similarly, in some examples, each of the second connecting portions 1204 includes an angled portion 1210 extending along the first axis 208 in a second direction 1211, opposite the first direction 1207, away from the fourth annular body 408 radially outward relative to the first axis 208, as shown in FIG. 12. Further, in such examples, each of the second connecting portions 1204 also includes a mounting portion (e.g., having a relatively flat or smooth surface) 1212, adjacent a respective one of the angled portions 1210, that extend along the first axis 208 in the second direction 1211 away from the fourth annular body 408 to be received by and couple to a respective one of the first connecting portions 1202. As shown in FIG. 12, the angled portion(s) 1210 and the respective mounting portions 1212 form and/or define an angle.

FIG. 13 is an exploded view of the third example damper assembly 1200 of FIG. 12. As shown in FIG. 13, the first portion 328, the second portion 330, the third portion 332 of the third damper assembly 1200 are separated from each other. According to the illustrated example of FIG. 13, the first connecting portion(s) 1202 are configured to be received by and couple to (e.g., via welding) respective ones of the second connecting portion(s) 1204. As shown in FIG. 13, the turbine 308 includes four of the first connecting portions 1202, which are positioned at or near and/or distributed along a radius (e.g., an outermost radius) of the turbine 308. The first connecting portions 1202 extend and/or curve away from the surface 344 of the turbine 308 toward the second connecting portions 1204. Further, as shown in FIG. 13, the first portion 328 includes four of the second connecting portions 1204, which are positioned at or near and/or distributed along a radius (e.g., an outermost radius) of the fourth annular body 408. The second connecting portions 1204 extend and/or curve away from the fourth annular body 408 toward the first connecting portions 1202. In some examples, the second connecting portions 1204 are interposed between the protrusions 410 for changing the state of the damping element(s) 304, 305. That is, in some examples, each of the second connecting portions 1204 is positioned between adjacent ones of the protrusions 410.

In some examples, to facilitate coupling the third damper assembly 1200 to the clutch 306, the first portion 328 includes one or more openings 1302 positioned on the fourth annular body 408, four of which are shown in this example. The openings 1302 of FIG. 13 are positioned on and/or extend through respective ones of the second connecting portions 1204. In particular, the openings 1302 are configured to receive respective ones of the connecting portions 338 of the clutch plate 336, thereby coupling the clutch 306 to the first portion 328. As such, when the clutch 306 is engaged, the first gear 322, first portion 328, the clutch plate 336, and the cover 202 rotate cooperatively resulting from the clutch plate connecting portions 338 engaging surfaces of the fourth annular body 408 defined by the respective openings 1204.

FIG. 14 is an assembled view of the third example damper assembly 1200 of FIG. 12. That is, the first, second, and third portions 328, 330, 332 are assembled. Operation of the third damper assembly 1200 of FIG. 12 is similar to the operation of the first and second damper assemblies 300, 700 of FIGS. 6 and 9. For example, during operation of the torque converter 200 when the clutch 306 is in the engaged state, the first portion 328 rotates relative to the second portion 330 about the first axis 208 in the first rotational direction 418 and/or the second rotational direction 420, thereby compressing and decompressing, via the protrusion(s) 410, the primary damping elements 304 and/or the secondary damping elements 305. According to the illustrate example of FIG. 7, the first connecting portions 1202 are coupled to the respective ones of the second connecting portions 1204, for example, via the mounting portions 1208, 1212.

Figure 15:
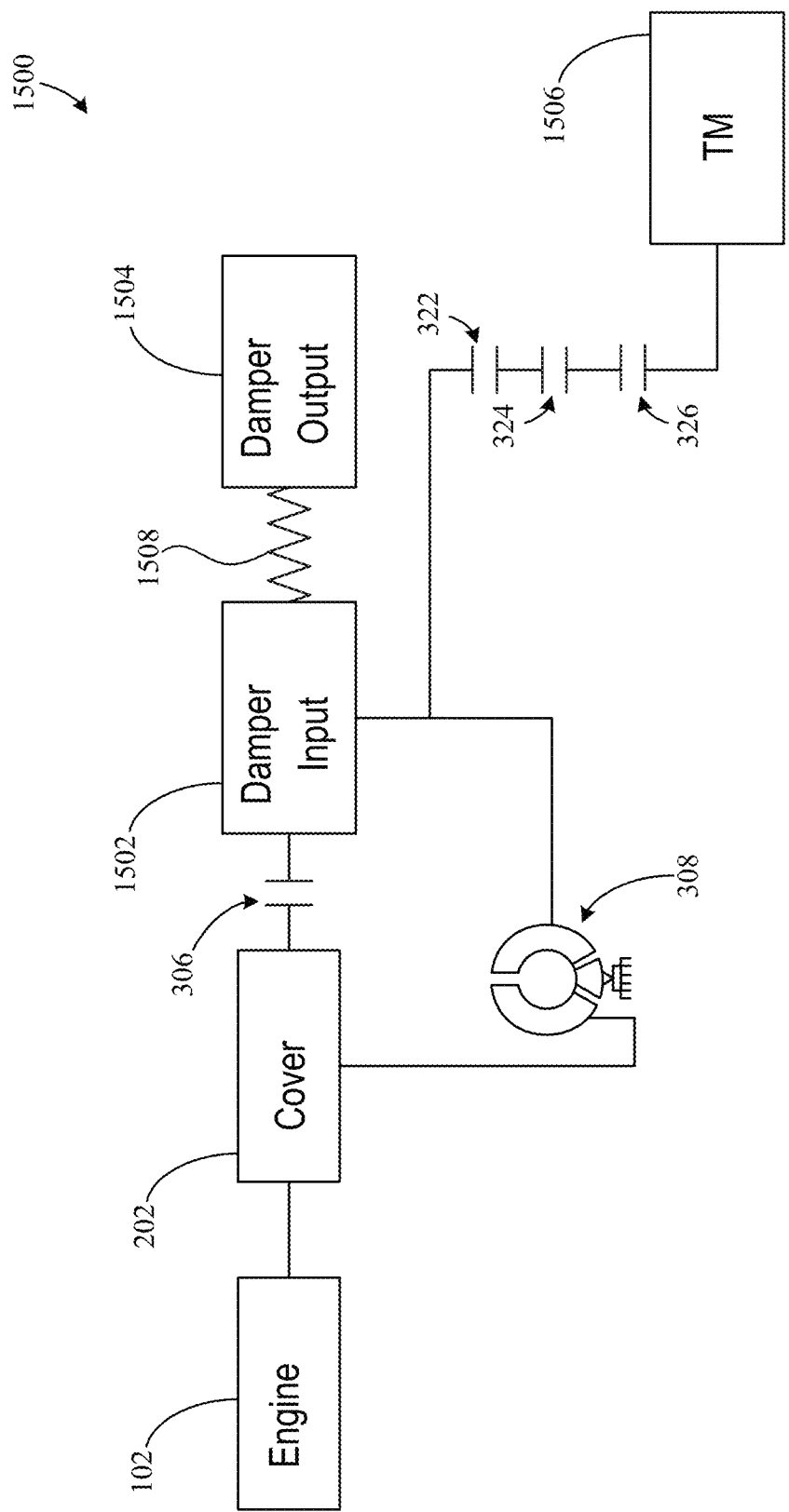
FIG. 15 is a schematic illustration of a second example damper configuration in accordance with the teachings of this disclosure.

FIG. 15 is a schematic illustration of a second example damper configuration 1500 in accordance with the teachings of this disclosure. In some examples, the second damper configuration 1500 is used to implement the third damper assembly 1200 of FIGS. 12-14. According to the illustrated example of FIG. 15, the second damper configuration 1500 includes a second example damper input 1502 that is configured to connect to the cover 202, which is sometimes referred to as a primary side. In some examples, the cover 202 is configured to connect to the first gear 322 and/or the first portion 328, for example, via the clutch 306 and the fourth annular body 408. As such, the clutch 306 is operatively coupled to and/or interposed between the cover 202 and the damper input 1502 to transfer torque from the engine 102 to the damper input 1502 when the clutch 306 is engaged. That is, in such examples, the second damper input 1502 includes the first gear 322 and/or the first portion 328.

Further, the turbine 308 is also configured to connect to the second damper input 1502. That is, the turbine 308 is configured to connect to the first gear 322 and/or the first portion 328, for example, via the fourth annular body 408 and the first and second connecting portions 1202, 1204. As such, inertia of the turbine 308 affects and/or is input into the second damper input 1502 but not an example transmission (e.g., an automatic transmission system) 1506 system of the vehicle 100. In some examples, the first portion 328 is coupled to the turbine 308 such that the inertia of the turbine 308 affects and/or is input into the first portion 328. In such examples, as a result of such coupling, the turbine 308 increases a mass of the first portion 328. That is, the mass of the turbine 308 is added to the mass of the first portion 328. Additionally, the turbine 308 is configured to fluidly interact with and/or connect to the impeller 204 (which is coupled to the cover 202) to generate torque, via the fluid 310, when the clutch 306 is disengaged and the cover 202 is rotating. Further, the second damper configuration 1500 includes a second example damper output 1504 such as, for example, the second gear(s) 324 and/or the second portion 330. Further still, the third gear 326 and/or the third portion 332 are configured to connect to the vehicle transmission system 1504 to provide engine output thereto, for example, via the first shaft 206 and the cylindrical body 1008.

The second damper configuration 1500 also includes a second example torsional vibration damper 1508 operatively coupled to and/or interposed between the second damper input 1502 and the second damper output 1504. In some examples, the second torsional vibration damper 1502 includes one or more of the primary damping elements 304 and/or the secondary damping elements 305. In particular, the third gear 326 provides torque to the transmission system 1506 and/or otherwise controls output of the first shaft 206 based on a damping characteristic of the second torsional vibration damper 1508, such as stiffness and/or softness. Accordingly, one or more of the damping elements 304, 305 is/are sized, shaped, structured, and/or otherwise configured to provide the damping characteristic such that, when the clutch 306 is engaged, the third gear 326 receives substantially no torsional vibrations and/or sudden movements caused by the engine 102.

It will be appreciated that the damper apparatus for use with vehicle torque converters disclosed in the foregoing description provide numerous advantages. Examples disclosed herein provide one or more damper assemblies for a vehicle torque converter having improved damper performance. Additionally, disclosed examples reduce costs typically associated with torque converter dampers.

Although certain example systems, apparatus, and articles of manufacture have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A damper assembly for a vehicle torque converter, comprising:
a first portion operatively coupled to a clutch of the vehicle torque converter and configured to receive an engine torque from the clutch based on a state of the clutch;
a hub rotatably coupled to a turbine of the vehicle torque converter;
a second portion interposed between first portion and the hub, the first portion, the second portion, and the hub rotatable relative to each other about an axis of the vehicle torque converter;
a gear train between the first portion and the second portion in an axial direction of the damper assembly, the gear train, including:
a ring gear coupled to the first portion;
a planet gear rotatably coupled to the second portion; and
a sun gear coupled to the hub, the planet gear operatively coupled between the ring gear and the sun gear; and
a primary damping element positioned in a cavity formed by the second portion, rotation of the first portion relative to the second portion compressing and decompressing the primary damping element to dampen a torsional vibration associated with the engine torque.

2. The damper assembly of claim 1, wherein the second portion is coupled to the turbine such that inertia of the turbine affects the second portion.

3. The damper assembly of claim 2, wherein the second portion includes a tab extending away from a surface of the second portion toward the turbine, the tab configured to couple to a surface of the turbine.

4. The damper assembly of claim 2, wherein the second portion includes an annular body, further including a ring interposed between the turbine and the annular body, the ring coupling the turbine and the annular body together.

5. The damper assembly of claim 1, wherein the first portion is coupled to a turbine of the vehicle torque converter such that inertia of the turbine affects the first portion.

6. The damper assembly of claim 1, wherein a ratio defined by the ring gear and the sun gear is between 2 and 6.

7. The damper assembly of claim 1, wherein the first portion includes an annular body and a slot positioned on the annular body, the slot configured to receive a connecting portion of a clutch plate.

8. The damper assembly of claim 1, further comprising:
an annular body coupled to the turbine, the annular body including an inner circumferential surface configured to slidably engage an outer circumferential surface of the hub.

9. The damper assembly of claim 8, wherein the annular body includes a groove formed by the inner circumferential surface of the annular body, a fluid to flow through the groove to provide lubrication to at least the hub and the annular body during operation of the vehicle torque converter.

10. A damper assembly for a vehicle torque converter, comprising:
a first portion operatively coupled to a clutch of the vehicle torque converter and configured to receive an engine torque from the clutch based on a state of the clutch;
a hub rotatably coupled to a turbine of the vehicle torque converter;
a second portion interposed between first portion and the hub, the first portion, the second portion, and the hub rotatable relative to each other about an axis of the vehicle torque converter;
a gear train, including:
a ring gear coupled to the first portion;
a planet gear rotatably coupled to the second portion; and a sun gear coupled to the hub, the planet gear operatively coupled between the ring gear and the sun gear; and a primary damping element positioned in a cavity formed by the second portion, rotation of the first portion relative to the second portion compressing and decompressing the primary damping element to dampen a torsional vibration associated with the engine torque, wherein the first portion includes an annular body and a protrusion coupled to the annular body, the protrusion extending away from the annular body at least partially into the cavity and configured to engage a seat proximate to the primary damping element.

11. A damper assembly for a vehicle torque converter, comprising:

a first portion operatively coupled to a clutch of the vehicle torque converter and configured to receive an engine torque from the clutch based on a state of the clutch;

a hub rotatably coupled to a turbine of the vehicle torque converter;

a second portion interposed between first portion and the hub, the first portion, the second portion, and the hub rotatable relative to each other about an axis of the vehicle torque converter;

a gear train, including:
   a ring gear coupled to the first portion;
   a planet gear rotatably coupled to the second portion; and
   a sun gear coupled to the hub, the planet gear operatively coupled between the ring gear and the sun gear;

a primary damping element positioned in a cavity formed by the second portion, rotation of the first portion relative to the second portion compressing and decompressing the primary damping element to dampen a torsional vibration associated with the engine torque; and a secondary damping element positioned within the primary damping element.

* * * * *